US009209623B1

(12) United States Patent
Sortomme

(10) Patent No.: US 9,209,623 B1
(45) Date of Patent: Dec. 8, 2015

(54) METHODS AND SYSTEMS FOR CHARGING ELECTRICAL DEVICES VIA AN ELECTRICAL SYSTEM

(75) Inventor: Eric Vesle Sortomme, Seattle, WA (US)

(73) Assignee: University of Washington Through its Center for Commercialization, Seattle, WA (US)

( * ) Notice: Subject to any disclaimer, the term of this patent is extended or adjusted under 35 U.S.C. 154(b) by 687 days.

(21) Appl. No.: 13/191,087

(22) Filed: Jul. 26, 2011

Related U.S. Application Data

(60) Provisional application No. 61/370,776, filed on Aug. 4, 2010.

(51) Int. Cl.
H02J 7/00 (2006.01)
H02J 3/14 (2006.01)
H02J 3/00 (2006.01)

(52) U.S. Cl.
CPC ............ *H02J 3/14* (2013.01); *H02J 7/0027* (2013.01); *H02J 2003/007* (2013.01); *Y02T 90/168* (2013.01); *Y04S 10/126* (2013.01)

(58) Field of Classification Search
CPC ........... H02J 7/00; H02J 7/0004; H02J 3/005; H02J 7/0008; H02J 7/0027; H02J 7/0073; Y02E 60/721; H01M 2010/4271; G01R 31/3651; Y02T 10/7088; Y02T 90/14; Y02T 90/163; Y04S 30/14; Y04S 10/126
See application file for complete search history.

(56) References Cited

U.S. PATENT DOCUMENTS

| 4,383,210 A * | 5/1983 | Wilkinson | 320/109 |
|---|---|---|---|
| 5,642,270 A | 6/1997 | Green et al. | |
| 7,693,609 B2 * | 4/2010 | Kressner et al. | 700/291 |
| 7,886,166 B2 | 2/2011 | Shnekendorf et al. | |
| 8,266,075 B2 * | 9/2012 | Ambrosio et al. | 705/412 |
| 8,471,520 B2 * | 6/2013 | Coe et al. | 320/101 |

(Continued)

FOREIGN PATENT DOCUMENTS

WO 2013025782 2/2013

OTHER PUBLICATIONS

T. Yong, reserve determination with Stochastic Optimal Power Flow, IEEE 2009.*

(Continued)

*Primary Examiner* — Sean Shechtman
(74) *Attorney, Agent, or Firm* — McDonnell Boehnen Hulbert & Berghoff LLP

(57) ABSTRACT

Disclosed herein are methods, systems, and devices that may be implemented by an energy aggregator to control, or regulate, the electric load placed on an electric grid by an aggregation of electrical devices, such as electric vehicles. Generally, the disclosed methods, and systems may provide for the modulation of the power draw of each electric vehicle around a first power draw, or scheduled power draw. Further, the disclosed methods and systems provide for the determination of a desirable scheduled power draw for a given electric vehicle. In one example, the scheduled power draw may be determined based on, among other things, the amount of time left in a given charging scenario and the state of charge of the given electric vehicle. In another example, the scheduled power draw may be determined based on, among other considerations, a maximization of the profit derived by the energy aggregator for both providing power to an aggregation of electric vehicles and for providing a regulation function to the electrical grid (at the request, for example, of an electrical-system operator).

30 Claims, 9 Drawing Sheets

(56) References Cited

U.S. PATENT DOCUMENTS

| | | | |
|---|---|---|---|
| 8,531,162 | B2 | 9/2013 | Hafner et al. |
| 2002/0138176 | A1* | 9/2002 | Davis et al. .................... 700/286 |
| 2005/0274553 | A1* | 12/2005 | Salman et al. ............... 180/65.2 |
| 2007/0282495 | A1 | 12/2007 | Kempton et al. |
| 2008/0039980 | A1 | 2/2008 | Pollack et al. |
| 2008/0040295 | A1 | 2/2008 | Kaplan et al. |
| 2008/0040296 | A1* | 2/2008 | Bridges et al. ............... 705/412 |
| 2008/0249965 | A1 | 10/2008 | Pollack et al. |
| 2009/0030712 | A1* | 1/2009 | Bogolea et al. ................... 705/1 |
| 2009/0040029 | A1 | 2/2009 | Bridges et al. |
| 2009/0043519 | A1 | 2/2009 | Bridges et al. |
| 2009/0043520 | A1 | 2/2009 | Pollack et al. |
| 2009/0063680 | A1 | 3/2009 | Bridges et al. |
| 2009/0066287 | A1 | 3/2009 | Pollack et al. |
| 2009/0200988 | A1 | 8/2009 | Bridges et al. |
| 2009/0222143 | A1 | 9/2009 | Kempton |
| 2009/0313033 | A1* | 12/2009 | Hafner et al. ..................... 705/1 |
| 2009/0313034 | A1* | 12/2009 | Ferro et al. ........................ 705/1 |
| 2009/0313103 | A1* | 12/2009 | Ambrosio et al. ......... 705/14.25 |
| 2009/0313174 | A1* | 12/2009 | Hafner et al. .................. 705/80 |
| 2010/0082464 | A1* | 4/2010 | Keefe ............................. 705/32 |
| 2010/0094476 | A1* | 4/2010 | Hamilton et al. ............. 700/295 |
| 2010/0174667 | A1* | 7/2010 | Vitale et al. ................... 705/412 |
| 2010/0179862 | A1* | 7/2010 | Chassin et al. .................. 705/10 |
| 2010/0274697 | A1* | 10/2010 | Zyren ............................. 705/34 |
| 2011/0004358 | A1 | 1/2011 | Pollack et al. |
| 2011/0106328 | A1* | 5/2011 | Zhou et al. .................... 700/291 |
| 2011/0191265 | A1* | 8/2011 | Lowenthal et al. ........... 705/412 |
| 2011/0245987 | A1* | 10/2011 | Pratt et al. ..................... 700/295 |

OTHER PUBLICATIONS

Tesla Gear Shop, Tesla Moble Connector, Roadster Charging, downloaded from the internet http://shop.teslamotors.com/collections/charging on Dec. 15, 2014.

International Search Report and Written Opinion dated Mar. 21, 2013 for International Patent Application No. PCT/US2012/050907, 3 pages.

Electric Reliability Council of Texas, "Market Information," downloaded from http://www.ercot.com/mktinfo/ on Dec. 10, 2014.

eVgo, "Home Dock Installation Included," downloaded from the internet https://web.archive.org/web/20120609071858/https://www.evgonetwork.com/The_Network/ on Dec. 12, 2014.

McBride, G. "EV Charging is a Demand Response Opportunity," Aztech Associates Inc. Power Point presentation, Feb. 1, 2011.

National Household Travel Survey Our Nation's Travel, downloaded from the internet http://nhts.ornl.gov on Dec. 10, 2014.

Nissan LEAF Features and Specifications, downloaded from the internet https://web.archive.org/web/20100424023601/http:/www.nissanusa.com Dec. 12, 2014.

Nissan Motor Company, Nissan LEAF Specs, downloaded from the internet https://web.archive.org/web/20131004233535/http://www.nissan-zeroemission.com on Dec. 15, 2014.

Tomic, et al., "Using Fleets of Electric-drive Vehicles for Grid Support," Journal of Power Sources, vol. 168, pp. 459-468, (Mar. 2007).

Quinn, et al, "The Effect of Communication Architecture on the Availability, Reliability, and Economics of Plug-in Hybrid Electric Vehicle-to-Grid Ancillary Services," Journal of Power Sources, vol. 195, pp. 1500-1509, (Sep. 2009).

PJM Manual 11, Energy & Ancillary Services Market Operations, (Jun. 2014).

Amjady, "Day-Ahead Price Forecasting of Electricity Markets by a New Fuzzy Neural Network," IEEE Transactions on Power Systems, vol. 21, pp. 887-896, (May 2006).

Berdichevsky, et al., "The Tesla Roadster Battery System," Tesla Motors, pp. 1-5, (Aug. 2006).

Rotering, et al, "Optimal Charge Control of Plug-In Hybrid Electric Vehicle in Deregulated Electricity Markets," IEEE Transactions on Power Systems, vol. 26, No. 3, (Aug. 2011).

Brooks, "Vehicle-to-Grid Demonstration Project: Grid Regulation Ancillary Service with Battery Electric Vehicle," AC Propulsion, Inc., pp. 1-55, (Dec. 2002).

Brooks, et al., "Using Real-Time Control of Demand to Help Balance Generation and Load," IEEE Power and Energy Magazine, 10, pp. 1540-7977, (Jun. 2010).

Brooks, et al., "PG&E and Tesla Motors: Vehicle to Grid Demonstration and Evaluation Program", Proc. 23rd Electr. Veh.Symp, pp. 1-10, (Dec. 2007).

Clement-Nyns, et al., "The Impact of Charging Plug-In Hybrid Electric Vehicles on a Residential Distribution Grid," IEEE Transactions on Power Systems, vol. 25, No. 1, pp. 371-380, (Feb. 2010).

Dallinger, et al., "Vehicle-to-Grid Regulation Reserves Based on a Dynamic Simulation of Mobility Behavior," IEEE Transactions on Smart Grid, vol. 2, No. 2, pp. 302-313, (Jun. 2011).

Sortomme, et al. "Optimal Scheduling of Vehicle-to-Grid Energy and Ancillary Services"; IEEE Transactions on Smart Grid; vol. 3, No. 1; pp. 351-359, (Mar. 2012).

Sortomme, et al.,"The effect of Electric Vehicle drive efficiency on bidding Vehicle-to-Grid services"; IEEE Electric Machines & Drives Conference; pp. 1288-1293, (May 2011).

Fan, et al., "Short-Term Load Forecasting Based on an Adaptive Hybrid Method," IEEE Transactions on Power Systems, vol. 21, No. 1, pp. 392-401, (Feb. 2006).

Galus, et al., "Provision of Load Frequency Control by PHEVs, Controllable Loads, and a Cogeneration Unit," IEEE Transactions on Industrial Electronics, vol. 58, No. 10, pp. 4568-4582 (Oct. 2011).

Grant, "CVX: Matlab Software for Disciplined Convex Programming," CVS Research, Inc. (Printed Dec. 2014).

Guille, et al., "A conceptual framework for vehicle-to-grid (V2G) implementation," Energy Policy, vol. 37, pp. 4379-4390, (Jun. 2009).

Hadley, et al., "Potential Impacts of Plug-in Hybrid Electric Vehicles on Regional Power Generation," Regional Grids and Plug-in Hybrids, pp. 1-71, (Jan. 2008).

Han, et al., "Development of an Optimal Vehicle-to-Grid Aggregator for Frequency Regulation," IEEE Transactions on Smart Grid, vol. 1, No. 1, pp. 65-72, (Jun. 2010).

Hanai, et al., "Load Management using Heat-Pump Water Heater and Electric Vehicle Battery Charger in Distribution System with PV," Journal International Council on Electrical Engineering, vol. 1, No. 2, pp. 207-213, (Mar. 2011).

Harris, "Average Distance to Work," Puget Sound Trends, No. T10, pp. 1-3, (Dec. 2007).

Kelly, "New Modeling Techniques: From Wind Assessment and Forecasting to Wind Resource Management," Precision Wind, LLC., pp. 1-41, (Jul. 2007).

Kempton, et al., "A Test of Vehicle-to-Grid (V2G) for Energy Storage and Frequency Regulation in the PJM System," University of Delaware, pp. 1-32, (Nov. 2008).

Kempton, et al., "Vechicle-to-Grid Power: Battery, Hybrid, and Fuel Cell Vehicles as Resources for Distributed Electric Power in California," pp. 1-78, (Jun. 2001).

Kempton, et al., "Vehicle-togrid power fundamentals: Calculating capacity and net revenue," Journal of Power Sources, vol. 144, pp. 268-279, (Apr. 2005).

Kempton, et al., "Vehicle-to-grid power implementation; From stabilizing the grid to supporting large-scale renewable energy," Journal of Power Sources, vol. 144, pp. 280-294, (Apr. 2005).

Lopes, et al., "Integration of Electric Vehicles in the Electric Power System," Proceedings of the IEEE, vol. 99, No. 1, (Jan. 2011).

Makarov, et al., "The Future Impact of Wind on BPA Power System Ancillary Services," IEEE, pp. 1-5, (Apr. 2008).

Markel, et al., "Communication and Control of Electric Vehicles Supporting Renewables," National Renewable Energy Laboratory, (Sep. 2009).

Pillai, et al., "Integration of Vehicle-to-Grid in the Western Danish Power System," IEEE Transactions on Sustainable Energy, vol. 2, No. 1, (Jan. 2011).

Mini E Specifications, BMW, Dec. 2003.

Mitsubishi Motors Press Release, Jun. 2009.

Sortomme et al. "Optimal Charging Strategies for Unidirectional Vehicle-to-Grid"; IEEE Trans. On Smart Grid; 2 (1):131-138, (Mar. 2011).

Sortomme, et al, "Coordinated Charging of Plug-In Hybrid Electric Vehicles to Minimize Distribution System Losses," IEEE Transactions on Smart Grid, vol. 2, No. 1, (Mar. 2011).

(56) References Cited

OTHER PUBLICATIONS

Sovacool, et al, "Beyond batteries: an examination of the benefits and barriers to plug-in hybrid electric vehicles (PHEVs) and a vehicle-to-grid (V2G) transition," Energy Policy, vol. 37, pp. 1095-1103, (Dec. 2008).

Open Access Transmission Tariff, Bonneville Transmission Planning Process, (Sep. 2009).

PJM Mainual 28: Operating Agreement Accounting, (Apr. 2014).

Ota, et al., "Autonomous Distributed Vehicle-to-Grid for Ubiquitous Power Grid and its Effect as a Spinning Reserve,", Journal of International Council on Electrical Engineering, vol. 1, No. 2, pp. 214-221, (Mar. 2011).

Peterson, et al., "The Economics of Using Play-in Hybrid Electric Vehicle Battery Packs for Grid Storage," Journal of Power Sources, vol. 195, pp. 2377-2384, (Oct. 2009).

Peterson, et al., "Lithium-ion Battery Cell Degradation Resulting from Realistic Vehicle and Vehicle-to-Grid Utilization," Journal of Power Sources, vol. 195, pp. 2385-2392, (Nov. 2009).

* cited by examiner

METHODS AND SYSTEMS FOR CHARGING ELECTRICAL DEVICES VIA AN ELECTRICAL SYSTEM

RELATED APPLICATIONS

This application claims priority to U.S. Provisional Patent Application Ser. No. 61/370,776 filed Aug. 4, 2010, entitled Optimal Charging Strategies for Unidirectional Vehicle-to-Grid, which is incorporated herein in its entirety.

BACKGROUND

Today, power is typically generated by a given power-generation source (e.g., a coal-, natural gas-, nuclear-, hydro-, or oil-based power plant, and/or, increasingly, some other renewable energy source, such as wind or solar) and then transmitted and distributed throughout a given geographic region via an electrical grid. Entities that generate, transmit, and/or distribute power may be referred to as utilities, while entities that coordinate, control, and/or monitor electricity transmission throughout the electrical grid may be referred to as electrical-system operators (e.g., a regional transmission organization (RTO) or an independent system operator (ISO)). Grids covering large geographic regions, such as the United States, may consist of a patchwork of utilities and operators.

Individuals increasingly demand inexpensive and more power to support various activities—yet those same individuals, generally, do not desire to have that energy produced near their homes (e.g., by power plants, which may generate, in addition to power, pollution, noise, etc.). To address this problem, utilities and operators attempt to generate and distribute power in a manner that is as efficient and unobtrusive as possible. As a result, advances in efficient approaches to energy management, e.g., efficient approaches to energy generation, transmission, and distribution, are clearly desired.

One recent approach to efficient energy management involves the aggregation of many electrical devices connected to an electrical grid (including those that are relatively small consumers/resources of energy) by an energy aggregator, such that the many electrical devices may be treated as a single, significant entity that is connected to the electrical grid. Thereby, such energy aggregators may enable an electrical-system operator, and other entities associated with the electrical grid more generally, to treat the aggregated electrical devices as a power generation source and/or a storage device. Within this configuration, it may be possible to control the aggregated electrical devices in a unidirectional and/or a bidirectional manner. For instance, in the unidirectional case, the respective power draw of the aggregated electrical devices may be controlled such that those electrical devices are treated as a controllable load. And in the bidirectional case, the energy stored in aggregated electrical devices to be pumped back into the electrical grid.

SUMMARY OF THE INVENTION

Recent advancements in electric vehicles suggest that electric vehicles are poised to become more and more pervasive in coming years. As such, electric vehicles (which, generally, run on power supplied by a battery), may be one type of electrical device well suited for control via an energy-aggregation arrangement. While bidirectional control of electric vehicles has garnered significant interest of energy aggregators, in many ways unidirectional control of electric vehicles may be more desirable and/or practical, at least in the near future.

Bidirectional control of aggregated electric vehicles may be desirable to the extent that it enables an energy aggregator to cause the aggregated vehicles to both consume energy from and provide energy to the electrical grid. However, bidirectional control faces serious challenges for its adoption, especially in the short term. For example, in order to pump energy from electric vehicles back into the electrical grid, such electric vehicles may require special hardware. Further, bidirectional power flow gives rise to the need for anti-islanding protection, as well as the need to address numerous other interconnection issues, resulting in significant infrastructure-related concerns. Further still, bidirectional power flow results in increased cycling wear on batteries and, therefore, decreased lifetimes of batteries. And, not insignificantly, consumers may be resistant to allowing a utility to pull energy from the batteries of their electric vehicles. Such drawbacks of bidirectional control may apply to the aggregation of electrical devices other than electric vehicles.

However, many existing electric vehicles, and electrical devices more generally, can participate in unidirectional energy aggregation without the need for significant modifications to infrastructure, charging stations, or the electrical devices themselves. Thus, the optimization of unidirectional control of aggregated electrical devices, such as electrical vehicles, may have particular benefits. Nonetheless, efforts thus far to develop such optimization techniques have proven inadequate. Accordingly, the disclosure herein is generally directed to the unidirectional control of aggregated electrical devices.

Disclosed herein are methods, systems, and devices that enable the efficient control of respective power draws of various electrical devices in an electrical system. According to the disclosed methods, systems, and devices, an energy aggregator (or some other component) may control the electric load placed on an electric grid by an aggregation of electrical devices, such as electric vehicles. For instance, the energy aggregator may modulate the power draw of each electric vehicle around a first power draw (e.g., a scheduled power draw). Further, the energy aggregator may determine a desirable scheduled power draw for a given electric vehicle. In one example, the scheduled power draw may be determined based on, among other things, the amount of time left in a given charging scenario and the state of charge of the given electric vehicle. In another example, the scheduled power draw may be determined based on a maximization of the profit derived by the energy aggregator for both providing power to an aggregation of electric vehicles and for providing a regulation function to the electrical grid (e.g., at the request of an electrical-system operator).

A first embodiment of the disclosed methods, systems, and devices may take the form of a method that includes (a) determining, based on at least a respective state of charge of each electrical device from a set of electrical devices, a respective first power draw of each electrical device, where each electrical device is coupled to an electrical system, (b) receiving an electrical-system-regulation value from an electrical-system operator that indicates a variation from a scheduled power consumption of the electrical system, (c) determining a second power draw for a given electrical device from the set of electrical devices based on at least the determined respective first power draw for each electrical device and the received electrical-system-regulation value, and (d) transmitting to the given electrical device a power-draw message indicating the determined second power draw. The respective first power draw may be a respective scheduled power draw of each electrical device. The second power draw may be a respective dispatched power draw of each electrical device.

In an aspect of the first embodiment, determining the respective first power draw of each electrical device may involve maximizing an energy-aggregator profit based on various factors. For example, the energy-aggregator profit may be maximized based on at least the respective first power draw for each electrical device. As another example, the energy-aggregator profit may also be maximized based on at least one of (i) a respective maximum additional power draw for each electrical device, (ii) a respective minimum additional power draw for each electrical device, and (iii) a respective final state of charge for each electrical device. As yet another example, the energy-aggregator profit may be maximized subject to a set of conditions defined by at least (a) one of an income of the energy aggregator and a cost to the energy aggregator, (b) the respective first power draw of each electrical device, and (c) a respective maximum possible power draw of each electrical device. The energy-aggregator profit may be maximized based on other factors as well.

In another aspect of the first embodiment, determining the respective first power draw of each electrical device may involve dividing (i) a difference of a respective maximum charge capacity of each electrical device and a respective current state of charge of each electrical device by (ii) an amount of time remaining in a charging time period. According to such an aspect, the determined first power draw may be subject to at least one condition, such as (a) the first power draw is not greater than a charge remaining to be supplied to the given electrical device, (b) a maximum additional power draw of the given electrical device is the lesser of (i) a difference of a maximum possible power draw of the given electrical device and the first power draw of the given electrical device and (ii) a difference of the charge remaining to be supplied to the given electrical device and the first power draw of the given electrical device, and (c) a minimum additional power draw of the given electrical device is equal to the first power draw of the given electrical device.

In yet another aspect of the first embodiment, determining the second power draw may involve the use of one or more regulation algorithms. Such regulation algorithms may involve an analysis of, for example, the electrical-system-regulation value received from the electrical-system operator, a responsive-reserve-regulation value received from the electrical system operator, and/or the determined first power draw. Other examples are possible as well.

A second embodiment of the disclosed methods, systems, and devices may take the form of a computing device that includes a non-transitory computer readable medium; and program instructions stored on the non-transitory computer readable medium and executable by at least one processor to cause the computing device to: (a) determine, based on at least a respective state of charge of each electrical device from a set of electrical devices, a respective first power draw of each electrical device, where each electrical device is coupled to an electrical system, (b) receive an electrical-system-regulation value from an electrical-system operator that indicates a variation from a scheduled power consumption of the electrical system, (c) determine a second power draw for a given electrical device from the set of electrical devices based on at least the determined respective first power draw for each electrical device and the received electrical-system-regulation value, and (d) transmit to the given electrical device a power-draw message indicating the determined second power draw.

A third embodiment of the disclosed methods, systems, and devices may take the form of a physical computer-readable medium having computer executable instructions stored thereon, the instructions comprising: (a) instructions for determining, based on at least a respective state of charge of each electrical device from a set of electrical devices, a respective first power draw of each electrical device, where each electrical device is coupled to an electrical system, (b) instructions for receiving an electrical-system-regulation value from an electrical-system operator that indicates a variation from a scheduled power consumption of the electrical system, (c) instructions for determining a second power draw for a given electrical device from the set of electrical devices based on at least the determined respective first power draw for each electrical device and the received electrical-system-regulation value, and (d) instructions for transmitting to the given electrical device a power-draw message indicating the determined second power draw.

These as well as other aspects and advantages will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Further, certain aspects of the disclosure herein refer to the "optimization," or some variation thereof, of the power draw of a given electrical device. It should be understood that use of such a term (i.e. "optimization," or some variation thereof) is not mean to imply that the power draw reflects a power draw that is ideal, perfect, or desirable in all situations. Instead, such a term is used for purposes of example and explanation only to describe the example power draws that may be determined according to the various methods described herein. Therefore, use of the term "optimization," or some variation thereof, should not be taken to be limiting.

I. Example Electrical System

Figure 1:
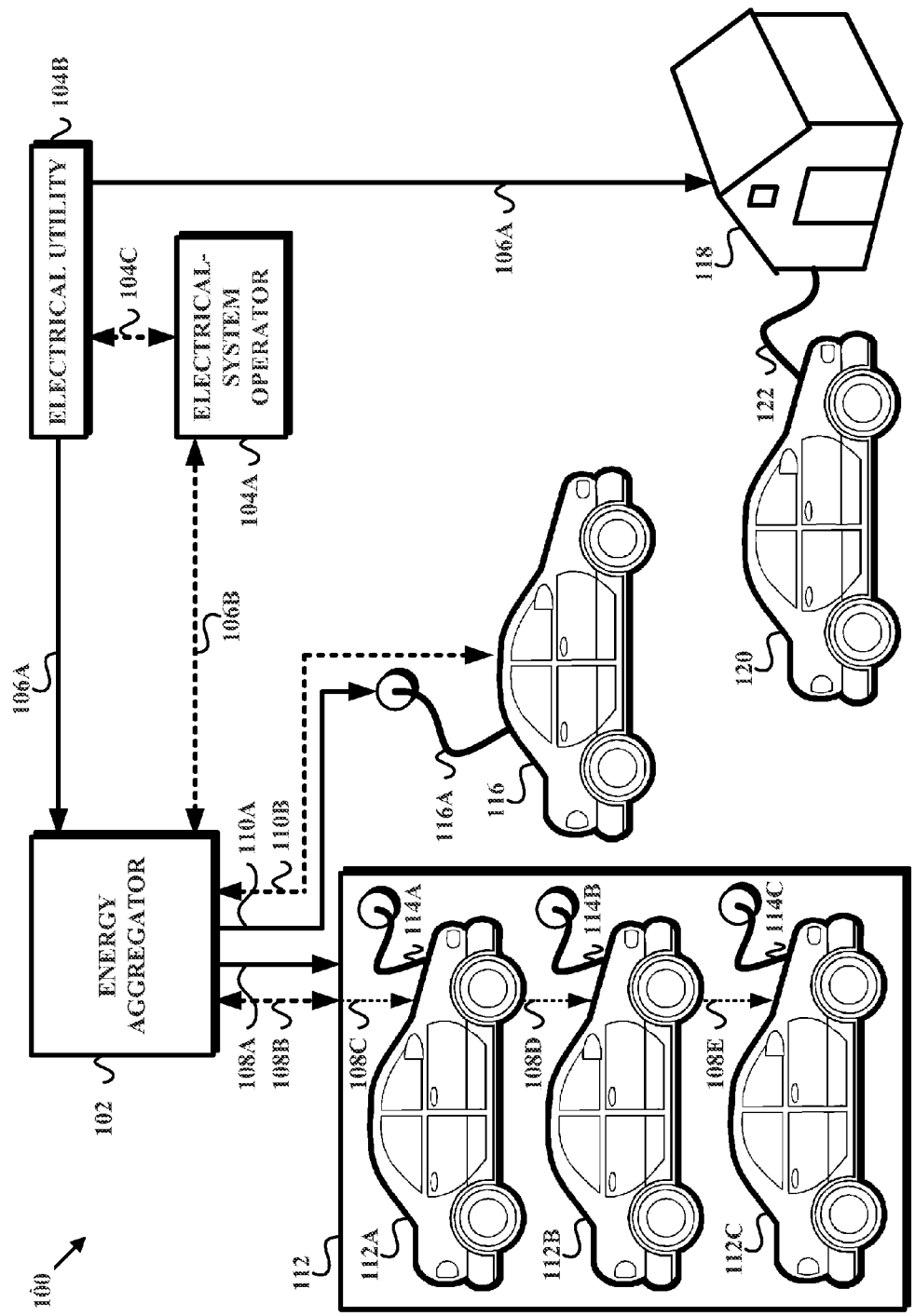
FIG. 1 depicts a simplified block diagram of an example electrical system in accordance with some embodiments.

FIG. 1 depicts a simplified block diagram of an example electrical system in accordance with some embodiments. It should be understood that this and other arrangements described herein are set forth only as examples. Those skilled in the art will appreciate that other arrangements and elements (e.g., machines, interfaces, functions, orders, and groupings of functions, etc.) can be used instead and that some elements may be omitted altogether. Further, many of the elements described herein are functional entities that may be implemented as discrete or distributed components in conjunction with other components and in any suitable combination and location. Various functions described herein as being performed by one or more entities may be carried out by hardware, firmware, and/or software. For instance, various functions may be carried out by a processor executing instructions stored in memory.

As shown in FIG. 1, example electrical system 100 includes energy aggregator 102, electrical-system operator 104A, and electrical utility 104B. Electrical system 100 also includes various electric vehicles such as electric vehicles 112A-112C (shown as parked in parking facility 112), 116, and 120, and includes home 118, each of which is directly or indirectly coupled to electrical-system operator 104A and electrical utility 104B. Additional entities could be present as well or instead. For example, there could be additional electric vehicles coupled to electrical-system operator 104 and/or energy aggregator 102; furthermore, there could be additional entities coupled to, or otherwise in communication with electrical-system operator 104 and/or energy aggregator 102, including electrical devices that consume energy other than electric vehicles 112A-112C, 116, and 120. Generally, electrical-system operator 104A, electrical utility 104B, and/or energy aggregator 102 may be coupled to one or more electrical grids and thereby may participate in the provisioning of electrical-energy services to electrical devices in electrical system 100.

Energy aggregator 102 may provide electrical energy to parking facility 112 by way of electrical link 108A. In turn, parking facility 112 may distribute electrical energy provided by energy aggregator 102 to each of electric vehicles 112A-112C by way of electrical interconnects 114A-114C, respectively, which may take any suitable form such as a power outlet. As one specific example, an electrical interconnect may take the form of a Society of Automotive Engineers (SAE) J1772 compliant electrical connector. Charging of an electric vehicle that is coupled to energy aggregator 102 via a SAE compliant electrical connector may be controlled by adjusting a control-pilot signal sent by energy aggregator 102 to the electric vehicle. It should be understood, however, that a SAE compliant electrical connector is but one example of an electrical interconnect, and that other types of electrical interconnects may be used as well.

Energy aggregator 102 may provide electrical energy to individual electric vehicle 116 by way of electrical link 110A, which may be accessed by electric vehicle 116 by way of electrical interconnect 116A. Generally, the disclosure herein is directed to the unidirectional provisioning of power, and thus, according to the example shown in FIG. 1, power may flow in a single direction between energy aggregator 102 to each of parking facility 112 and electric vehicle 116. That is, power may flow from energy aggregator 102 to each of parking facility 112 and electric vehicle 116. However, it should be understood that the disclosure herein could just as well be applied to, or otherwise carried out with, bidirectional electrical links and therefore, in at least this respect, the examples set forth in FIG. 1 should not be taken to be limiting.

Energy aggregator 102 may also be communicatively coupled to parking facility 112 and electric vehicle 116 by way of, for example, communication links 108A and 110A, respectively. Parking facility 112 may then indirectly communicatively couple electric vehicles 112A-112C with energy aggregator 102 by way of communication links 108C-108E, respectively.

As such, each of energy aggregator 102, parking facility 112, and electric vehicles 112A-112C and 116 may be arranged to carry out the communication functions described herein and may therefore include a communication interface. The communication interface may include one or more antennas, chipsets, and/or other components for communicating with other entities and/or devices in electrical system 100. The communication interface may be wired and/or wireless and may be arranged to communicate according to one or more communication protocols now known (e.g., CDMA, WiMAX, LTE, IDEN, GSM, WIFI, HDSPA) or later developed.

As shown, energy aggregator 102 may be electrically coupled to electric utility 104B by way of electrical link 106A. Although electrical link 106A is shown as a unidirectional electrical link, it should be understood that electrical link 106A may also be implemented as a bidirectional electrical link. Energy aggregator 102 may also be communicatively coupled to electrical-system operator 104A by way of communication link 106B. Further, electrical-system operator 104A may be communicatively coupled to electrical utility 104B by way of communication link 104C. As such, energy aggregator 102, electrical-system operator 104A, and electrical utility 104B may be arranged to include respective communication interfaces, such as that described above, so as to enable communications between or among themselves and/or other network entities.

Electrical utility 104B may be directly coupled to various other entities in electrical system 100, including, ultimately, electrical devices that are consumers of electrical energy. For example, electrical utility 104B may be connected to home 118 by way of electrical link 106A. In turn, home 118 may distribute electrical energy provided by electrical utility 104B to other electrical devices, such as electrical vehicle 120, by way of electrical interconnect 122.

Energy aggregator 102 may be any entity that carries out the energy-aggregator functions described herein. For example energy aggregator 102 may be any private or public organization, or combination thereof, that is generally authorized to connect to the electrical grid and therefore participate in electrical system 100.

Figure 2:
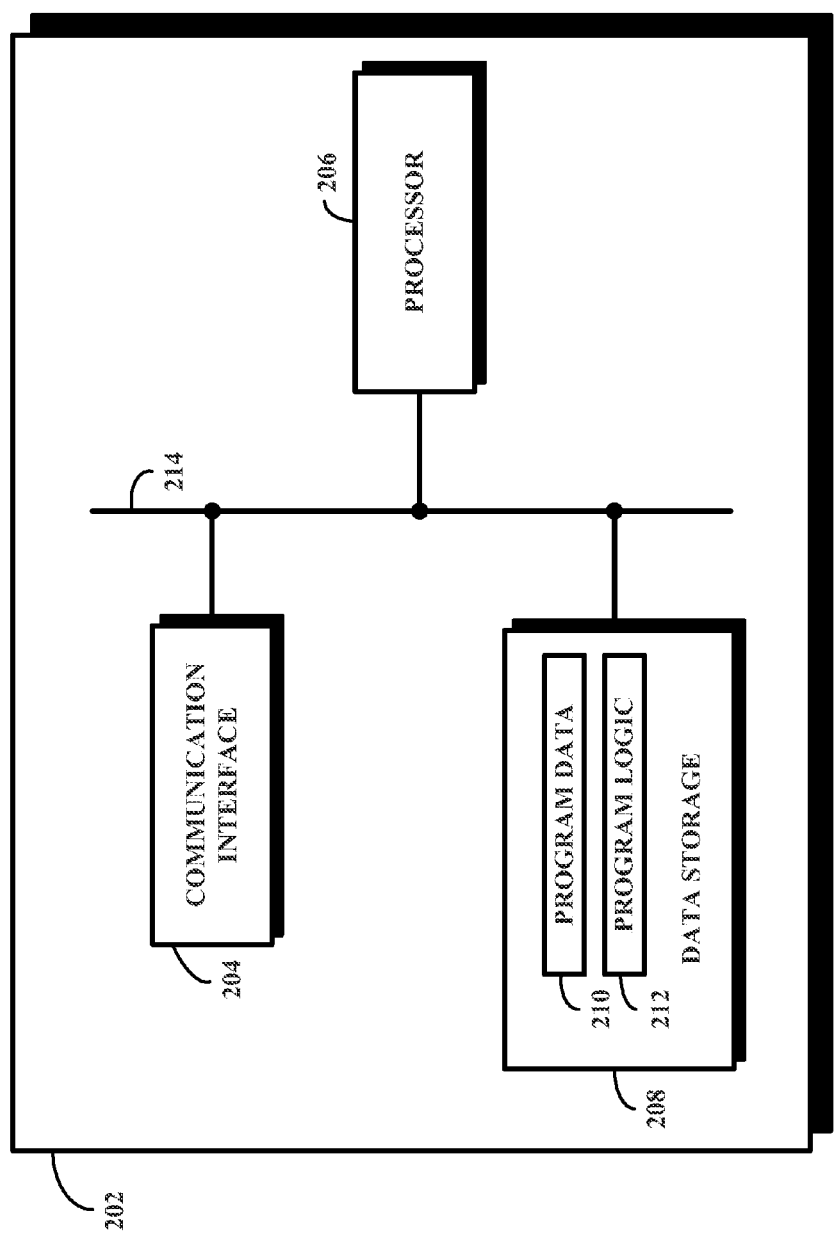
FIG. 2 depicts a simplified block diagram of an example energy-aggregator computing device in accordance with some embodiments.

Generally, energy aggregator 102 may include any necessary electrical system equipment, devices, or other elements necessary to both distribute electrical energy, as needed, and communicate with other entities and/or devices in electrical system 100. As an example, energy aggregator 102 may include a computing device, such as computing device 202 shown in FIG. 2. As shown, energy-aggregator computing device 202 may include, without limitation, a communication interface 204, processor 206, and data storage 208, all of which may be communicatively linked together by a system bus, network, and/or other connection mechanism 214.

Communication interface 204 typically functions to communicatively couple energy aggregator 102 to other devices and/or entities in electrical system 100. As such, communication interface 204 may include a wired (e.g., Ethernet, without limitation) and/or wireless (e.g., CDMA and/or Wi-Fi, without limitation) communication interface, for communicating with other devices and/or entities. Communication interface 204 may also include multiple interfaces, such as one through which energy-aggregator computing device 202 sends communication, and one through which energy-aggregator computing device 202 receives communication. Communication interface 204 may be arranged to communicate according to one or more types of communication protocols mentioned herein and/or any others now known or later developed.

Processor 206 may comprise one or more general-purpose processors (such as INTEL processors or the like) and/or one or more special-purpose processors (such as digital-signal processors or application-specific integrated circuits). To the extent processor 206 includes more than one processor, such processors could work separately or in combination. Further, processor 206 may be integrated in whole or in part with wireless-communication interface 204 and/or with other components.

Data storage 208, in turn, may comprise one or more volatile and/or non-volatile storage components, such as magnetic, optical, or organic memory components. As shown, data storage 208 may include program data 210 and program logic 212 executable by processor 206 to carry out various energy-aggregator functions described herein. Although these components are described herein as separate data storage elements, the elements could just as well be physically integrated together or distributed in various other ways. For example, program data 210 may be maintained in data storage 208 separate from program logic 212, for easy updating and reference by program logic 212.

Program data 210 may include various data used by energy-aggregator computing device 202 in operation. As an example, program data 210 may include information pertaining to various other devices and/or entities in electrical system 100 such as, without limitation, any of electrical system operator 104A, electrical utility 104B, parking facility 112, and/or electric vehicles 112A-112C and 116. Similarly, program logic 212 may include any additional program data, code, or instructions necessary to carry out the energy-aggregator functions described herein. For example, program logic 212 may include instructions executable by processor 206 for causing computing device 202 to carry out any of those functions described herein with respect to FIGS. 3-8.

II. Example Functions

Figure 3:
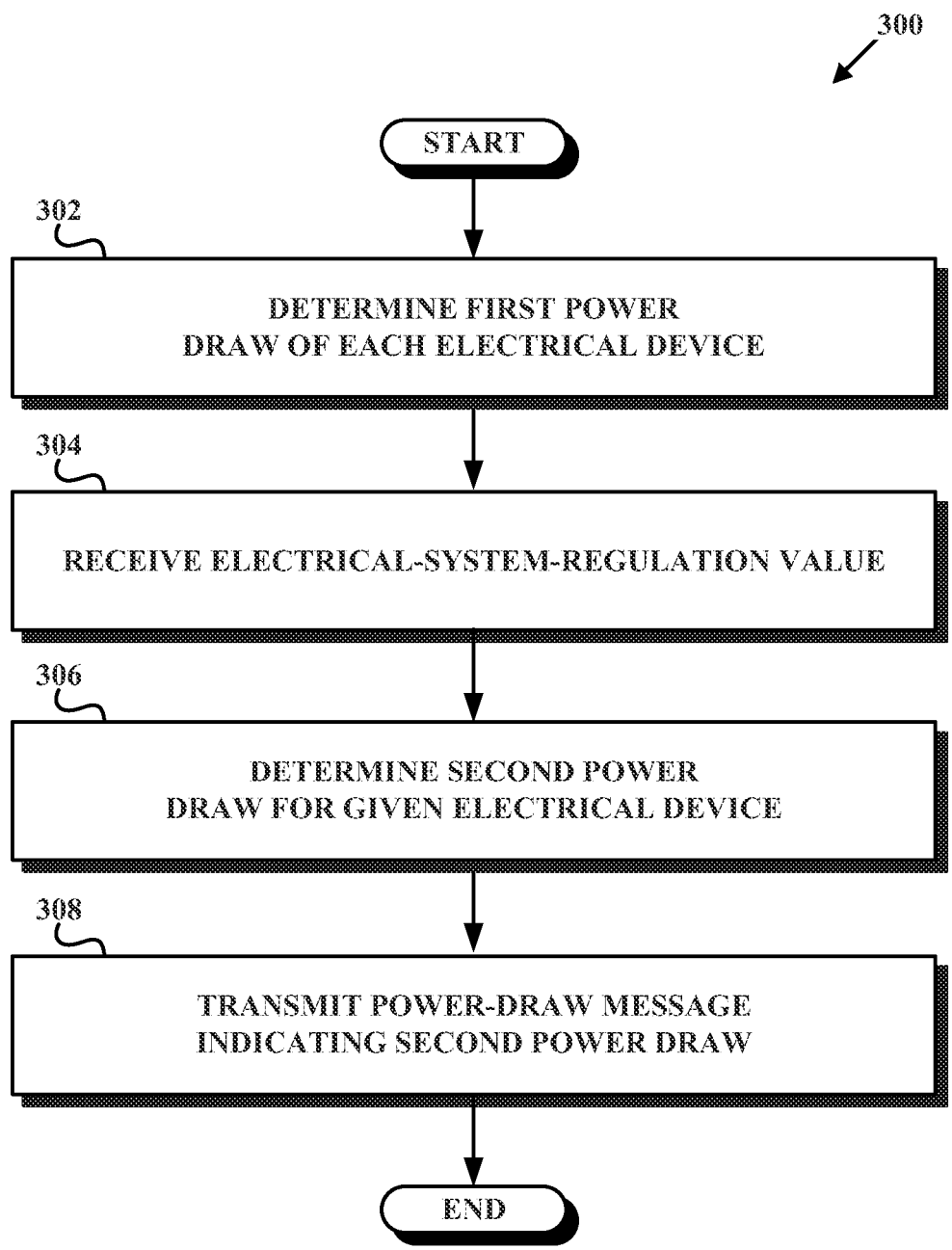
FIG. 3 depicts a simplified flow chart of an example energy-optimization method in accordance with some embodiments.
Figure 4:
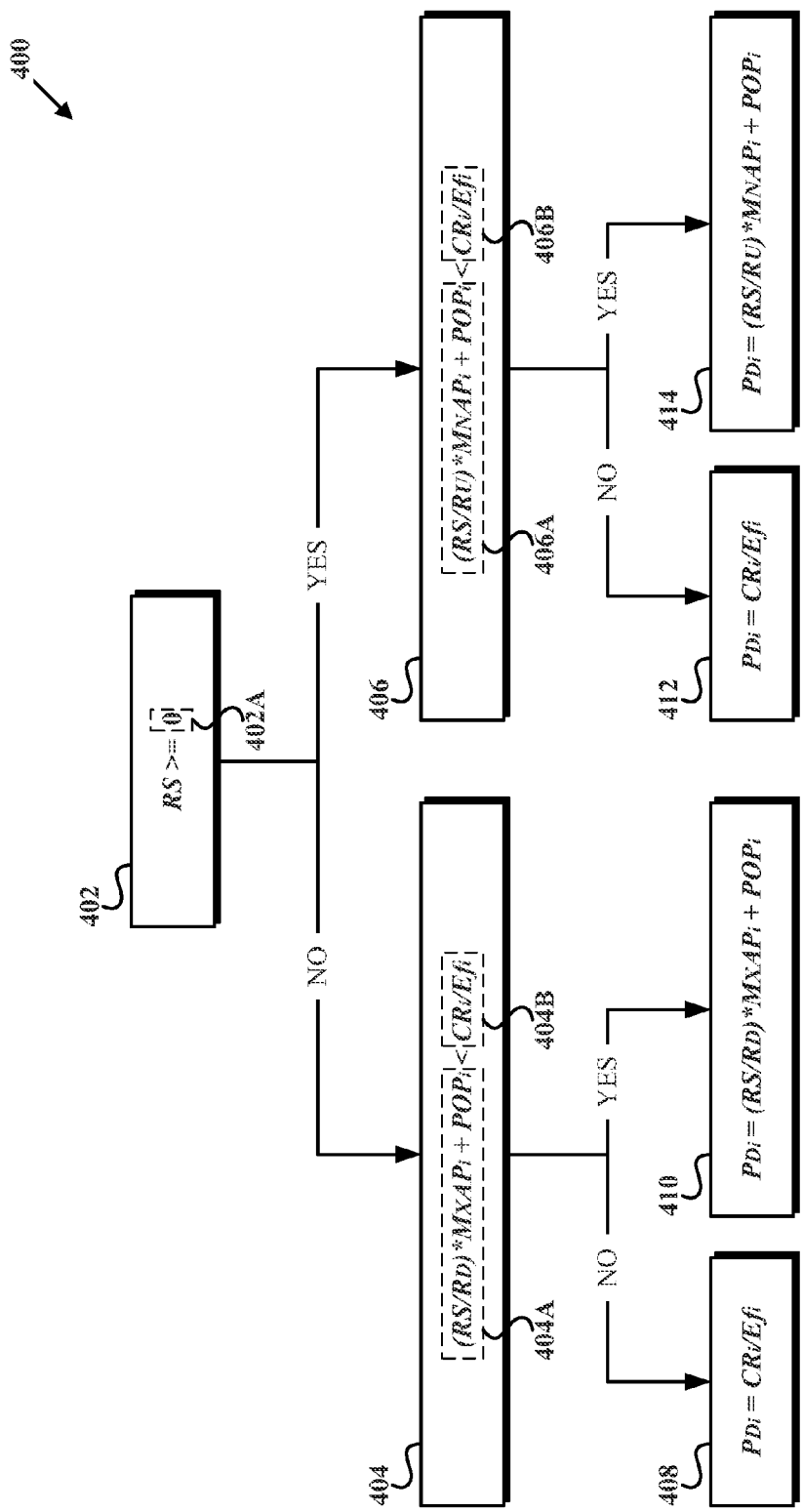
FIG. 4 depicts a simplified regulation-algorithm flowchart in accordance with some embodiments.
Figure 5A:
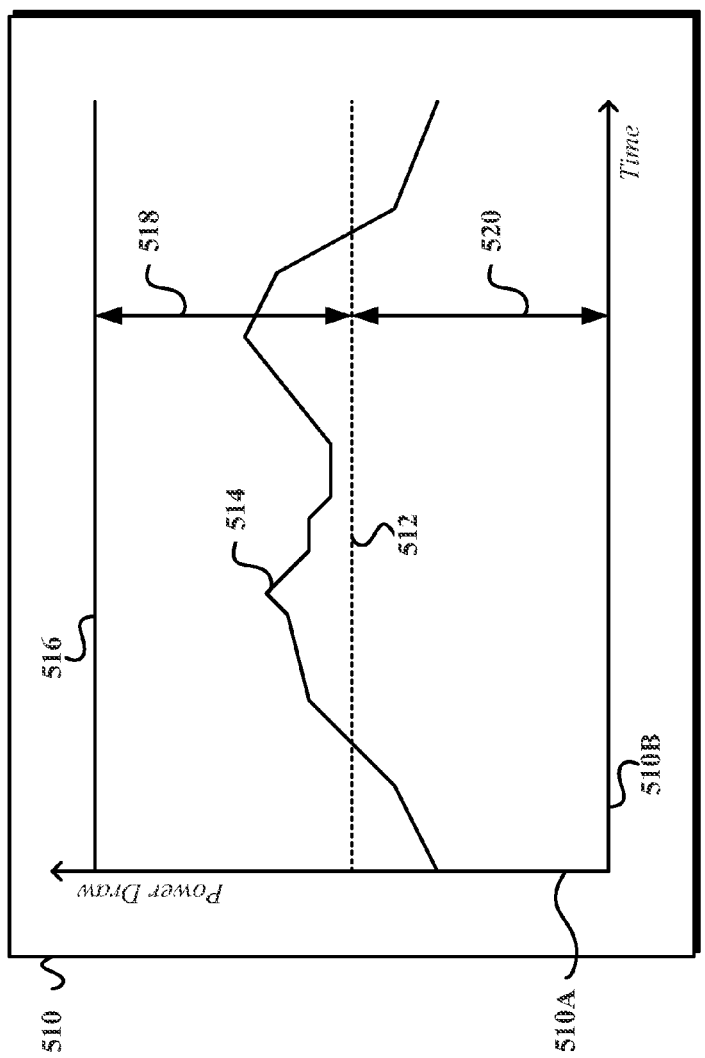
FIG. 5A depicts a power-draw chart in accordance with some embodiments.
Figure 5B:
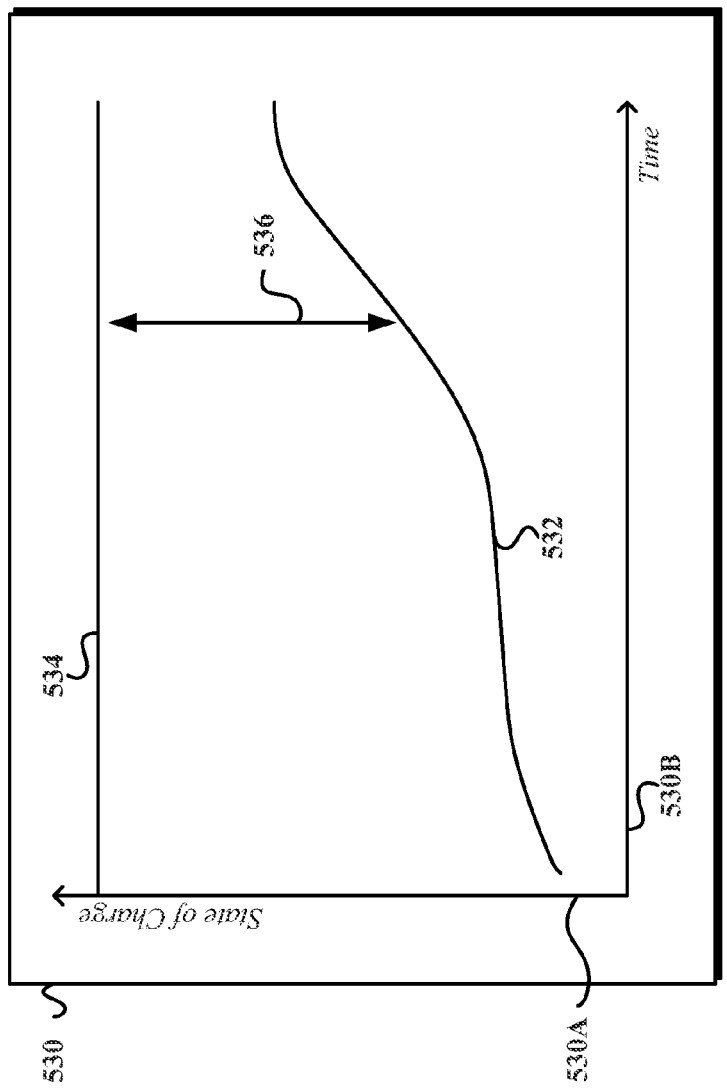
FIG. 5B depicts a state-of-charge chart in accordance with some embodiments.

FIGS. 3-5 are generally directed to an example method for unidirectional control of aggregated electrical devices such as electric vehicles. More specifically, FIG. 3 depicts a simplified flow chart of an example energy-optimization method, method 300, in accordance with some embodiments. Correspondingly, FIG. 4 depicts a simplified regulation-algorithm flowchart in accordance with some embodiments, including embodiments that implement aspects of method 300. FIG. 5A depicts a power-draw chart, and FIG. 5B depicts a state-of-charge chart, in accordance with some embodiments, including embodiments that implement aspects of method 300.

Figure 6:
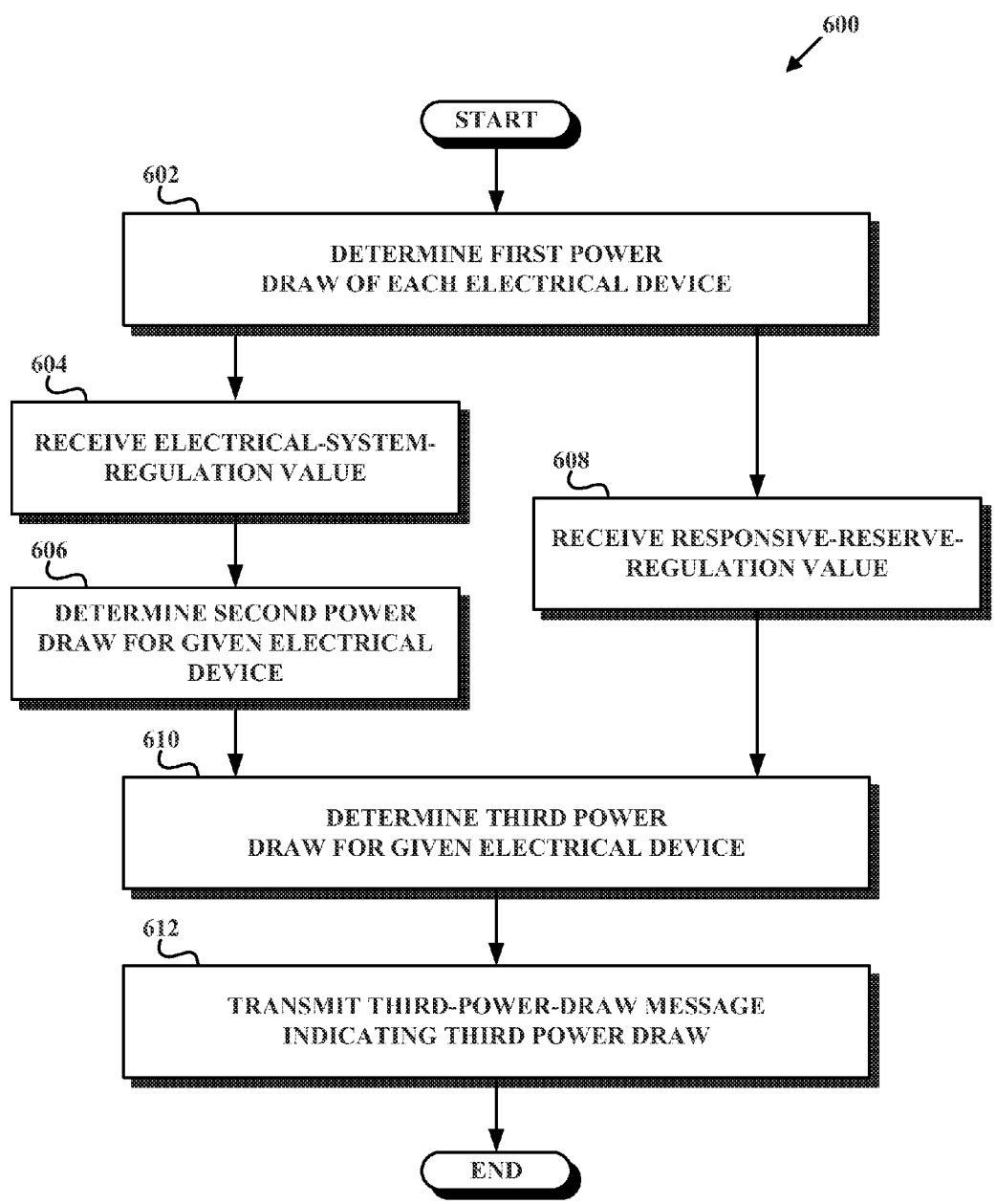
FIG. 6 depicts a simplified flow chart of an additional example energy-optimization method in accordance with some embodiments.
Figure 7:
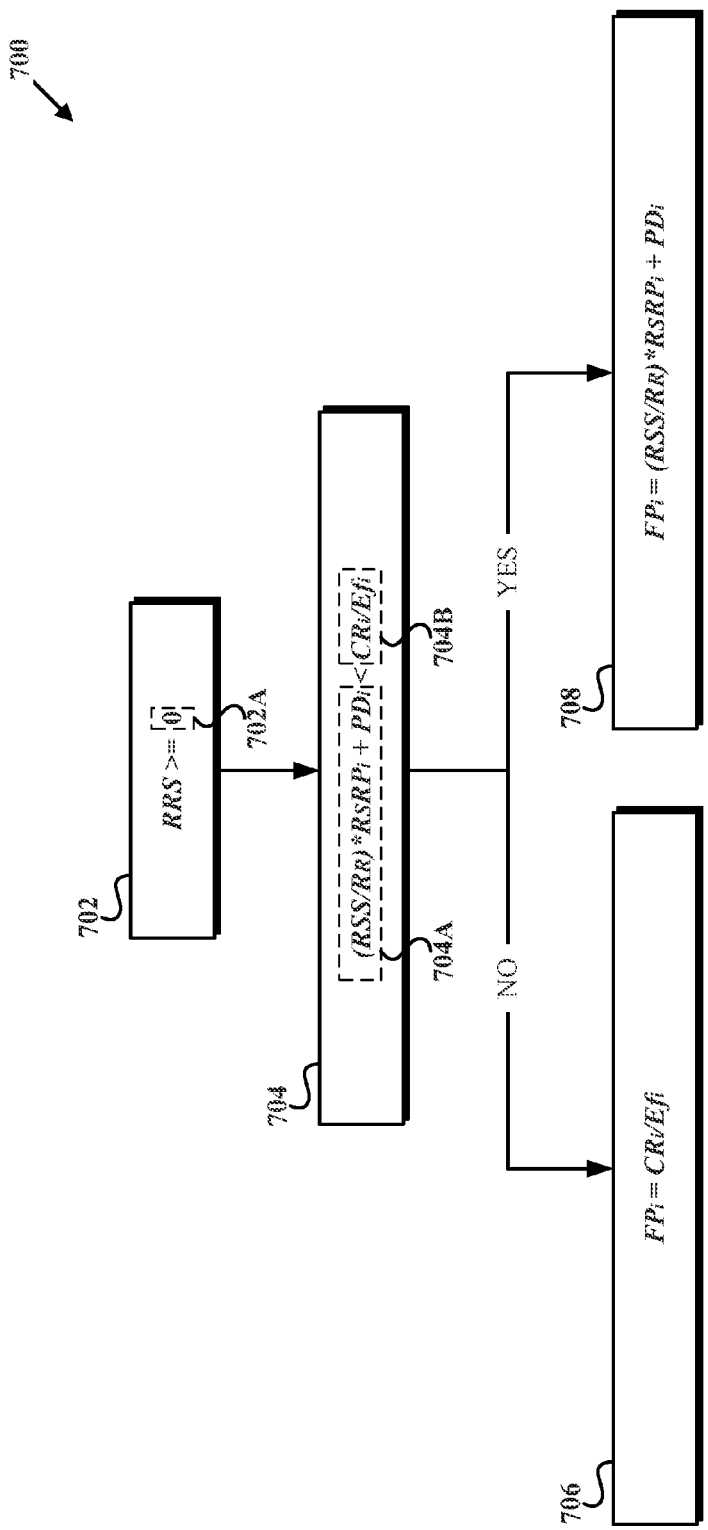
FIG. 7 depicts an additional regulation-algorithm flowchart in accordance with some embodiments.
Figure 8:
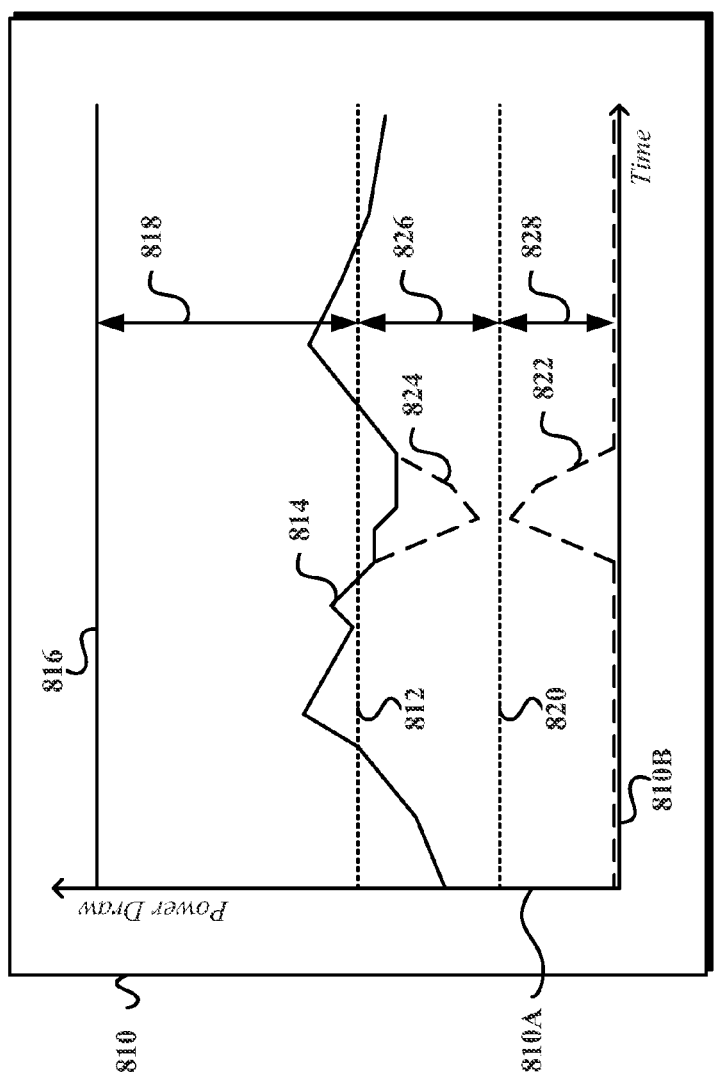
FIG. 8 depicts an additional power-draw chart in accordance with some embodiments.

FIGS. 6-8 are generally directed to an additional example method for unidirectional control of aggregated electrical devices such as electric vehicles, which includes the control of utility responsive reserves. More specifically, FIG. 6 depicts a simplified flow chart of an additional example energy-optimization method, method 600, in accordance with some embodiments. Correspondingly, FIG. 7 depicts an additional regulation-algorithm flowchart in accordance with some embodiments, including embodiments that implement aspects of method 600. FIG. 8 depicts an additional power-draw chart in accordance with some embodiments, including embodiments that implement aspects of method 600.

Generally, the methods and functions described herein may be carried out in an electrical system, such as example electrical system 100, by an energy aggregator, such as energy aggregator 102. Again, however, it should be understood that example electrical system 100 is set forth for purposes of example and explanation only, and should not be taken to be limiting. The present methods and functions may just as well be carried out in other electrical systems having other arrangements.

As noted above, the methods and systems described herein may enable energy aggregator 102 to efficiently control respective power draws of various electrical devices in electrical system 100. Before turning to a more detailed description of such methods and systems, a brief summary of some of the nomenclature used in the remainder of the disclosure is provided, for convenience.

a. Nomenclature

The variables in the table set forth below may be referred to in the remainder of this disclosure for purposes of explanation of the methods disclosed herein. However, it should be understood that reference to such variables is for purposes of example and explanation only, and that the listing of such variables below is for purposes of convenience only, and therefore neither the variables themselves, nor the listing of the variables below, shall be taken to be limiting.

| | |
|---|---|
| $\alpha$ | Percentage of regulation revenue taken by the energy aggregator. |
| $\rho$ | Penalty fee that the energy aggregator must pay the customer per kWh for failure to meet the desired minimum-allowable state of charge. |
| $Av_i(t)$ | Availability of the ED for V2G. 1 if the ED is available and 0 otherwise. |
| C | Cost to the energy aggregator. |
| $Comp_i(t)$ | Compensation factor of the $i^{th}$ ED to account for unplanned departures. |
| $CR_i$ | Charge remaining to be supplied to the $i^{th}$ ED. |
| $Dep_i(t)$ | Probability that the $i^{th}$ ED will depart unexpectedly in hour t. |
| $E(PD_i(t))$ | Expected value of energy received by $i^{th}$ ED. |
| $Ef_i$ | Efficiency of the $i^{th}$ ED's battery charger. |
| $Ex_D$ | Expected percentage of regulation down capacity dispatched each hour. |
| $Ex_R$ | Expected percentage of responsive reserve capacity dispatched each hour. |
| $Ex_U$ | Expected percentage of regulation up capacity dispatched each hour. |
| EVPer(t) | Expected percentage of the EDs remaining to connect to grid at hour t. |
| $FP_i$ | Final power draw of the $i^{th}$ ED combining the effects of regulation and responsive reserves. |
| H | Amount of time remaining in a charging period. |
| In | Income of the energy aggregator. |
| L(t) | System net load (load minus renewables) at time t. |
| $MC_i$ | Maximum charge capacity of the $i^{th}$ ED. |
| Mk | Energy-aggregator markup over wholesale energy price. |
| $MnAP_i$ | Minimum additional power draw of the $i^{th}$ ED. |
| $Mn_L$ | Minimum day-ahead forecasted net load. |
| $Mn_P$ | Minimum day-ahead forecasted energy price. |
| $MP_i$ | Maximum possible power draw of $i^{th}$ ED. |
| MxAPi | Maximum additional power draw of the $i^{th}$ ED. |
| $Mx_L$ | Maximum day-ahead forecasted net load. |
| $Mx_P$ | Maximum day-ahead forecasted energy price. |
| P(t) | Energy price at time t. |
| $PD_i$ | Power draw of the $i^{th}$ ED. |
| $POP_i$ | Preferred (target) operating point of the $i^{th}$ ED. |
| $P_{RD}(t)$ | Forecasted price of regulation down for time t. |
| $P_{RR}(t)$ | Forecasted price of responsive reserves for time t. |
| $P_{RU}(t)$ | Forecasted price of regulation up for time t. |

-continued

| | |
|---|---|
| $R_D$ | Regulation down capacity of the aggregator. |
| $R_R$ | Responsive reserve capacity of the energy aggregator. |
| RRS | Responsive reserve signal provided to the aggregator. |
| RS | Electrical-system-regulation value provided to the energy aggregator. |
| $R_S RP_i$ | Reduction in power draw available for spinning reserves of the $i^{th}$ ED. |
| $R_U$ | Regulation up capacity of the energy aggregator. |
| $SOC_i$ | Current state of charge of the $i^{th}$ ED. |
| $SOCm_i$ | Final state of charge of the $i^{th}$ ED. |
| $SOC_{min,i}$ | Minimum-allowable state of charge of the $i^{th}$ ED. |
| $SOC_{I,i}$ | Initial state of charge of the $i^{th}$ ED. |
| $Trip_i$ | Reduction in SOC that results from the evening commute trip home on a weekday or the second daily trip on the weekend. |
| $T_{trip,i}$ | Time that the $i^{th}$ ED makes its second trip of the day. On a weekday this is the commute from work to home. On the weekend this is simply the second excursion which ends when the ED returns home. | b. Energy Optimization

With reference to FIG. 3, method 300 begins at step 302 when the energy aggregator determines, based on at least a respective state of charge of each electrical device from a set of electrical devices, a respective first power draw of each electrical device, where each electrical device is coupled to an electrical system. At step 304, the energy aggregator receives an electrical-system-regulation value from an electrical-system operator that indicates a variation from a scheduled power consumption of the electrical system. At step 306, the energy aggregator determines a second power draw for a given electrical device from the set of electrical devices based on at least the determined respective first power draw for each electrical device and the received electrical-system-regulation value. And at step 308, the energy aggregator transmits to the given electrical device a power-draw message indicating the determined second power draw. Each of these steps is discussed further below.

i. Determine First Power Draw of Each Electrical Device

At step 302, energy aggregator 102 determines, based on at least a respective state of charge of each electrical device from a set of electrical devices such as set of electric vehicles 112A-112C, a respective first power draw of each electrical device, where each electrical device is coupled to electrical system 100.

Generally, the respective first power draw of each electrical device may be a respective scheduled power draw of each electrical device. Such a respective scheduled power draw is commonly referred to as a "Preferred Operating Point (POP)" in energy-aggregation contexts. As such, reference is made herein to Preferred Operating Points, and in particular to variables associated with a Preferred Operating Points, such as $POP_i$. However, it should be understood that such references are for purposes of example and explanation only and should not be taken to be limiting. Further, the terms "first power draw," "scheduled power draw," and "preferred operating point" may be used herein, at times, interchangeably.

For purposes of example and explanation, two example techniques for selecting a first power draw (or scheduled power draw) for each electrical device, in accordance with step 302, are described below. The first is an example heuristic charging algorithm that is referred to herein, without limitation, as a "smart selection algorithm." The second is an example optimal charging algorithm that is referred to herein, without limitation, as an "optimal selection algorithm." As described above, the use of the term "optimal" is for purposes of example and explanation only and should not be taken to be limiting.

According to one example smart selection algorithm, determining, based on at least the respective state of charge of each electrical device from the set of electrical devices, the respective first power draw of each electrical device involves dividing (i) a difference of a respective maximum charge capacity of each electrical device ($M_{C,i}$) and a respective current state of charge of each electrical device ($SOC_i$) by (ii) an amount of time remaining in a charging time period (H). Such an example smart selection algorithm is represented below by Equation 1.

$$POP_i(t) = \frac{M_{Ci} - SOC_i}{H} \quad (1)$$

In accordance with the smart charging algorithm represented by Equation 1, the determined first power draw, or preferred operating point, is constrained by at least one condition. As one such example condition, the first power may not be greater than a charge remaining to be supplied to the given electrical device ($CR_i$). Such an example condition is represented below by Equation 2.

$$POP_i = \min(POP_i, CR_i) \quad (2)$$

As another such example condition, a maximum additional power draw of the given electrical device (MxAPi) is the lesser of (i) a difference of a maximum possible power draw of the given electrical device ($MP_i$) and the first power draw of the given electrical device and (ii) a difference of the charge remaining to be supplied to the given electrical device ($CR_i$) and the first power draw of the given electrical device. Such an example condition is represented below by Equation 3.

$$MxAP_i = \min(MP_i - POP_i, CR_i - POP_i) \quad (3)$$

As yet another such example condition, a minimum additional power draw of the given electrical device ($MnAP_i$) is equal to the first power draw of the given electrical device. Such an example condition is represented below by Equation 4.

$$MnAP_i = POP_i \quad (4)$$

The determined first power draw may be subject to (or may otherwise be constrained by or define) each of the conditions represented by Equations 2-4. Together, such conditions may ensure that the given electrical device does not fully charge until the end of a given charging time period (H). They also define the regulation up capacity and regulation down capacity of each electrical device.

According to one example optimal selection algorithm, determining, based on at least the respective state of charge of each electrical device from the set of electrical devices, the respective first power draw of each electrical device may involve maximizing an energy-aggregator profit based on at least the respective first power draw for each electrical device. The energy-aggregator profit may be determined as a function of the income of the energy aggregator (In), cost to the energy aggregator (C), or a difference thereof (In–C).

Maximizing the energy-aggregator profit based on at least the respective first power draw for each electrical device may involve maximizing the energy-aggregator profit based on the respective first power draw for each electrical device and at least one additional consideration. One example of such an additional consideration is a respective maximum additional power draw for each electrical device (MxAPi). Another example of such an additional consideration is a respective minimum additional power draw for each electrical device ($MnAP_i$). Yet another example of such an additional consideration is a respective final state of charge for each electrical device (SOCm$_i$). The energy-aggregator profit may be maximized based on the respective first power draw for each electrical device and one or more of each such additional considerations. Maximization of the energy-aggregator profit according to all such conditions is represented below by Equation 5.

$$\text{maximize}_{POP_i(t), MxAP_i(t), MnAP_i(t), SOCm_i} \text{In} - C \quad (5)$$

In general, the income of the energy aggregator (In) may be determined based on at least a regulation-service income and an energy-supply-service income. In an example, the income of the energy aggregator (In) may be determined based on the sum of the regulation-service income and the energy-supply-service income. The regulation-service income may be defined by a percentage of regulation revenue taken by the energy aggregator ($\alpha$) multiplied by the summation of (i) a forecasted price of regulation up for time t ($P_{RU}(t)$) multiplied by a regulation up capacity of the energy aggregator for time t ($R_U(t)$) and (ii) a forecasted price of regulation down for time t ($P_{RD}(t)$) multiplied by a regulation down capacity of the energy aggregator for time t ($R_D(t)$), over time. The energy-supply-service income may be defined by a summation of an expected value of the energy received by each electrical device over time (E(PD$_i$(t))) multiplied by an energy-aggregator markup over wholesale energy price (Mk). Such an income of the energy aggregator (In) is represented below by Equation 6.

$$\text{In} = \alpha \Sigma_t (P_{RU}(t) R_U(t) + P_{RD}(t) R_D(t)) + Mk \Sigma_i \Sigma_t (E(PD_i(t))) \quad (6)$$

The regulation up capacity of the energy aggregator for time t ($R_U(t)$) may be defined as the summation of the respective minimum additional power draw for each electrical device (MnAP$_i$), as represented below by Equation 7.

$$R_U(t) = \sum_{i=1}^{devices} MnAP_i(t) \quad (7)$$

The regulation down capacity of the energy aggregator for time t ($R_D(t)$) may be defined as the summation of the respective maximum additional power draw for each electrical device (MxAP$_i$), as represented below by Equation 8.

$$R_D(t) = \sum_{i=1}^{devices} MxAP_i(t) \quad (8)$$

The energy received by each electrical device over time (E(PD$_i$(t))) may be further defined as a respective maximum additional power draw for each electrical device (MxAPi) multiplied by an expected percentage of regulation down capacity dispatched (Ex$_D$) plus the first power draw minus a respective minimum additional power draw for each electrical device (MnAP$_i$) multiplied by an expected percentage of regulation up capacity dispatched (Ex$_U$). Such an energy received by each electrical device over time (E(PD$_i$(t))) is represented below by Equation 9.

$$E(PD_i(t)) = MxAP_i(t) Ex_D + POP_i(t) - MnAP_i(t) Ex_U \quad (9)$$

Where:

$$Ex_D = \frac{\int_{RS_{min}}^{0} RS \cdot Pr(RS) \cdot dRS}{\int_{RS_{min}}^{0} RS \cdot dRS} \quad (10)$$

$$Ex_U = \frac{\int_{0}^{RS_{max}} RS \cdot Pr(RS) \cdot dRS}{\int_{0}^{RS_{max}} RS \cdot dRS} \quad (11)$$

In general, the cost of the energy aggregator (C) may be determined based on at least a respective minimum-allowable state of charge of each electrical device, a respective final state of charge of each electrical device, and a respective maximum charge capacity of each electrical device. In an example, the cost of the energy aggregator (C) may be determined based on a penalty fee that the energy aggregator must pay the customer per kilowatt hour (kWh) for failure to meet the desired minimum-allowable state of charge (p), multiplied by a summation of a respective maximum charge capacity of each electrical device (MG) multiplied by a difference of a respective minimum-allowable state of charge for each electrical device (SOC$_{min,i}$) and a respective final state of charge for each electrical device (SOCm$_i$). Such a cost of the energy aggregator (C) is represented below by Equation 12.

$$C = \rho \sum_{i=1}^{devices} (SOC_{min,i} - SOCm_i) MC_i \quad (12)$$

In general, maximizing the energy-aggregator profit may be subject to any one or more of a number of various conditions. Such conditions may be defined by various combinations (or formulations) of variables relevant to the operation of energy aggregator 102. As one example, maximizing the energy-aggregator profit may be subject to a set of conditions defined by at least the respective first power draw of each electrical device and a respective maximum possible power draw of each electrical device (MP$_i$). For instance, an example condition may be that the respective first power draw of each electrical device is less than or equal to a respective maximum possible power draw of each electrical device (MP$_i$). Such an example condition is represented below by Equation 13.

$$POP_i(t) \leq MP_i \quad (13)$$

Maximizing the energy-aggregator profit may be subject to any one or more of a number of additional various conditions defined by various combinations (or formulations) of variables relevant to the operation of energy aggregator 102. As represented by the equations above and below, for example, such additional considerations may be further defined by at least a bid-regulation up capacity of the energy aggregator ($R_U$), a respective minimum additional power draw of each electrical device (MnAP$_i$), a bid-regulation down capacity of the energy aggregator ($R_D$), a respective maximum additional power draw of each electrical device (MxAPi), a respective expected value of the energy received by each electrical device (E(PD$_i$(t))), a respective final state of charge of each electrical device (SOCm$_i$), a respective initial state of charge of each electrical device (SOC$_{Li}$), a respective charging efficiency of each electrical device ($Ef_i$), and a respective maximum charge capacity of each electrical device ($MC_i$). Further examples of such conditions are represented below by Equations 14-22.

$$MnAP_i(t) \le POP_i(t) \quad (14)$$

$$\Sigma_t(E(PD_i(t))) + SOC_i \ge SOCm_i \quad (15)$$

$$\Sigma_t(E(PD_i(t))) + SOC_i \le MC_i \quad (16)$$

$$(MxAP_i(1) + POP_i(1))Ef_i + SOC_{l,i} \le MC_i \quad (17)$$

$$MxAP_i(t) + POP_i(t) \le MP_i \quad (18)$$

$$MxAP_i(t) \ge 0 \quad (19)$$

$$MnAP_i(t) \ge 0 \quad (20)$$

$$POP_i(t) \ge 0 \quad (21)$$

$$SOCm_i \ge 0 \quad (22)$$

ii. Receive Electrical-System-Regulation Value

At step 304, energy aggregator 102 receives an electrical-system-regulation value from electrical-system operator 104A that indicates a variation from a scheduled power consumption of the electrical system. For example, electrical-system operator 104A may provide Electrical-system-regulation value (RS) to energy aggregator 102 by way of communication link 106B.

Electrical-system operator 104A may be arranged to monitor the state of electric resources of electrical utility 104B and compare the state of such electric resources to a pre-determined schedule of electric resources. In the event that the state of such electric resources varies from the predetermined schedule of electric resources, electrical-system operator 102A may indicate as much to energy aggregator 102 by way of communication link 106B.

As one example, in the event that the amount of power consumed by a certain segment of an electrical grid is below that which was scheduled for the electrical grid, electrical-system operator 104A may indicate that variation from schedule to energy aggregator 102 with the expectation that energy aggregator 102 will provide a regulation-down service (e.g., consume excess energy resources available from electrical utility 104B by consuming more energy resources than energy-aggregator 102 was originally scheduled to consume), if possible. As another example, in the event that the power consumed by a certain segment of an electrical grid is above that which was scheduled for the electrical grid, electrical-system operator 104A may indicate that variation from schedule to energy aggregator 102 with the expectation that energy aggregator 102 will provide a regulation-up service (e.g., consume less energy resources than energy-aggregator 102 was originally scheduled to consume), if possible.

iii. Determine Second Power Draw for Given Electrical Device

At step 306, energy aggregator 102 determines a second power draw for a given electrical device from the set of electrical devices based on at least the determined respective first power draw for each electrical device and the received electrical-system-regulation value.

Generally, the second power draw for the given electrical device may be a dispatched power draw for the given electrical device. That is, energy aggregator 102 may direct the given electrical device, perhaps via one of communication links 108B, 110B, or another similar communication link, to operate at the second power draw.

FIG. 4 depicts simplified regulation-algorithm flowchart 400 in accordance with some embodiments. At decision point 402 energy aggregator 102 determines whether the electrical-system regulation value (RS) exceeds system-regulation-value threshold 402A. Note that, in the example shown in FIG. 4, system-regulation-value threshold 402A is shown as being equal to "0." However, this is for purposes of example and explanation only, and should not be taken to be limiting.

If, at decision point 402, energy aggregator 102 determines that the electrical-system-regulation value (RS) exceeds system-regulation-value threshold 402A, then energy aggregator 102 may proceed to decision point 406 where energy aggregator 102 may determine whether first regulation value 406A is less than second regulation value 406B, where first regulation value 406A is a ratio of (i) the system-regulation value (RS) and (ii) a regulation-up capacity of the energy aggregator ($R_U$), multiplied by a minimum additional power draw of the given electrical device ($MnAP_i$), plus the first power draw of the given electrical device, and where second regulation value 406B is a ratio of (i) a charge remaining to be supplied to the given electrical device ($CR_i$) and (ii) a charging efficiency of the given electrical device ($Ef_i$).

If, at decision point 406, energy aggregator 102 determines that first regulation value 406A is less than second regulation value 406B, energy aggregator 102 may proceed to decision point 414 and determine that the second power draw is equal to first regulation value 406A (a ratio of (i) the system-regulation value (RS) and (ii) a regulation-up capacity of the energy aggregator ($R_U$), multiplied by a minimum additional power draw of the given electrical device ($MnAP_i$), plus the first power draw of the given electrical device).

If, at decision point 406, energy aggregator 102 determines that first regulation value 406A is greater than second regulation value 406B, energy aggregator 102 may proceed to decision point 412 and determine that the second power draw is equal to second regulation value 406B (a ratio of (i) a charge remaining to be supplied to the given electrical device ($CR_i$) and (ii) a charging efficiency of the given electrical device ($Ef_i$)).

If, at decision point 402, energy aggregator 102 determines that the electrical-system-regulation value (RS) does not exceed system-regulation-value threshold 402A, then energy aggregator 102 may proceed to decision point 404 where energy aggregator 102 may determine whether first regulation value 404A is less than second regulation value 404B, where first regulation value 404A is a ratio of (i) the electrical-system-regulation value (RS) and (ii) a regulation-down capacity of the energy aggregator ($R_D$), multiplied by a maximum additional power draw of the given electrical device ($MxAP_i$), plus the first power draw of the given electrical device, and where second regulation value 404B is a ratio of (i) a charge remaining to be supplied to the given electrical device ($CR_i$) and (ii) a charging efficiency of the given electrical device ($Ef_i$).

If, at decision point 404, energy aggregator 102 determines that first regulation value 404A is less than second regulation value 404B, energy aggregator 102 may proceed to decision point 410 and determine that the second power draw is equal to first regulation value 404A (a ratio of (i) the electrical-system-regulation value (RS) and (ii) a regulation-down capacity of the energy aggregator ($R_D$), multiplied by a maximum additional power draw of the given electrical device ($MxAP_i$), plus the first power draw of the given electrical device).

If, at decision point 404, energy aggregator 102 determines that first regulation value 404A is greater than second regulation value 404B, energy aggregator 102 may proceed to decision point 408 and determine that the second power draw is equal to first regulation value 404B (a ratio of (i) a charge remaining to be supplied to the given electrical device ($CR_i$) and (ii) a charging efficiency of the given electrical device ($Ef_i$)).

iv. Transmit Power-Draw Message Indicating Second Power Draw

At step 308, energy aggregator 102 transmits to the given electrical device a power-draw message indicating the determined second power draw. For example, energy aggregator 102 may transmit the power-draw message to parking facility 112 via communication link 108B, which may be relayed directly or indirectly to one of electric vehicles 112A-112C via communication links 108C-108E, respectively. As another example, energy aggregator 102 may transmit the power-draw message to electric vehicle 116 via communication link 110A.

As noted above, the second power draw may be a dispatched power draw, and accordingly, a given electrical device that receives the power-draw message may respond by adjusting the power draw of its battery to correspond (or to equal) the second power draw indicated in the power-draw message. In this way, the power draw of the given electrical device may vary in time, according to the second power draw determined by energy aggregator 102 for the given electrical device.

For purposes of example and explanation, FIG. 5A depicts power-draw chart 510 in accordance with some embodiments. FIG. 5A represents an example power draw 514 ($PD_i$) of a given electrical device. Note that in FIG. 5A, the amount of power draw of the given electrical device is shown as the vertical axis 510A and time is shown as the horizontal axis 510B.

Additionally, the first power draw (scheduled power draw or preferred operating point) 512 of the given electrical device is shown as constant in time. Thus, power draw 514 varies with time around, generally, first power draw 512 according to the second power draw indicated in the power-draw message provided by energy aggregator 102.

Further, power-draw chart 510 shows the maximum possible power draw of the given electrical device 516 ($MP_i$). Further still, power-draw chart 510 shows the maximum additional power draw of the given electrical device 518 ($MxAPi$), as well as the minimum additional power-draw of the given electrical device 520 ($MnAP_i$).

For purposes of example and explanation, FIG. 5B depicts state-of-charge chart 530 in accordance with some embodiments. FIG. 5B represents an example state of charge 532 ($SOC_i$) of a given electrical device. Note that in FIG. 5B, the state of charge of the given electrical device is shown as the vertical axis 530A and time is shown as the horizontal axis 530B.

Additionally, state-of-charge chart 530 shows a maximum charge capacity of the given electrical device 534 ($MC_i$), and a charge remaining to be supplied to the given electrical device 536 ($CR_i$). The state of charge 532 is shown as generally increasing with time (although at varying rates, in accordance with the second power draw indicated by the received power-draw message).

c. Energy Optimization with Responsive Reserves

Most electrical systems are arranged such that an electrical-system operator associated with the electrical system has access to responsive reserves—or extra generating capacity that is available in a short interval of time to meet demand in case, for example, a generator goes down or there is another disruption in the electrical supply of the electrical system. Such responsive reserves are commonly divided into spinning reserves (i.e., extra generating capacity that is available by increasing the power output of generators that are already connected to the power system), and supplemental reserves (i.e., extra generating capacity that is not currently connected to the electrical system but can be brought online after a short delay). Generally, such responsive reserves provide a particularly extreme regulation-up service.

Aggregated electrical devices that are under unidirectional control are able to provide a regulation-up service similar to that provided by responsive reserves by decreasing the amount of energy consumed by the aggregated electrical devices. That is, by decreasing the energy consumed by the aggregated electrical devices, the aggregation may decrease the electrical burden of the electrical system and thereby make additional energy resources available to other electrical-system entities. An energy aggregator, such as energy aggregator 102, may play a critical role in implementing such a responsive reserve function for an aggregation of electrical devices.

Further, while method 300 described with respect to FIG. 3, generally involved the optimization of electrical-device power draws over a given period of charging, it may be beneficial to optimize electrical-device power draws over longer periods of time, such as, for example, a day. Such an approach may enable an energy aggregator to more accurately account for the availability of electrical devices throughout the day and therefore maximize energy-aggregator profit to a further extent with the end result that the power draw dispatched to a given electrical device is even more desirable.

Accordingly, method 600 begins at step 602 when the energy aggregator determines, based on at least a respective state of charge of each electrical device from a set of electrical devices, a respective first power draw of each electrical device, where each electrical device is coupled to an electrical system. At step 604, the energy aggregator receives an electrical-system-regulation value from an electrical-system operator that indicates a variation from a scheduled power consumption of the electrical system. At step 606, the energy aggregator determines a second power draw for a given electrical device from the set of electrical devices based on at least the determined respective first power draw for each electrical device and the received electrical-system-regulation value. At step 608, the energy aggregator receives a responsive-reserve-regulation value from an electrical-system operator that indicates a requested-responsive-reserve amount. At step 610, the energy aggregator determines a third power draw for the given electrical device from the set of electrical devices based on at least the determined second power draw and the received responsive-reserve-regulation value. At step 612, the energy aggregator transmits to the given electrical device a third-power-draw message indicating the determined third power draw.

i. Determine First Power Draw of Each Electrical Device

At step 602, energy aggregator 102 determines, based on at least a respective state of charge of each electrical device from a set of electrical devices, a respective first power draw of each electrical device, where each electrical device is coupled to an electrical system.

Many of the general concepts and principals described above with respect to method 300 may be applied to method 600. Therefore, for conciseness in explanation, an example of the determination of the first power draw in accordance with step 602 of method 600 is presented below in the form of a number of equations. However, it should be understood that such equations provide but one example of the determination of the first power draw in accordance with method 600 and that other ways, methods, or manners of determining the first power draw may be possible as well. For instance, the various variables and conditions described by the equations below may be combined in various alternative ways including ways similar to that in which the various variable and conditions are explained as being combined with respect to method 300 above.

Generally, determining, based on at least the respective state of charge of each electrical device from the set of electrical devices, the respective first power draw of each electrical device in accordance with step 602 may involve maximizing an energy-aggregator profit based on at least the respective first power draw for each electrical device. Maximizing the energy-aggregator profit based on at least the respective first power draw for each electrical device may involve maximizing the energy-aggregator profit based on the respective first power draw for each electrical device and at least one additional consideration. Maximization of the energy-aggregator profit according to all such conditions is represented below by Equation 23.

$$\text{maximize}_{POP_i(t), MxAP_i(t), MnAP_i(t), SOCm_i} \text{In} - C \quad (23)$$

Maximization of energy-aggregator profit throughout the day, including a consideration of the provisioning of responsive reserves, may involve the consideration of a number of additional considerations beyond those explained above with respect to method 300. At a minimum, for example, maximization of the energy-aggregator profit may be subject to a set of conditions that includes a consideration of a reduction in power available for spinning reserves of each electrical device ($RsRP_i$). As another example, the set of conditions may include a consideration of a reduction in state of charge that results from the evening commute trip home on a weekday or the second daily trip on the weekend for each electrical device ($Trip_i$). Further additional considerations may be included in the conditions as well.

Thus, one example of maximizing the energy-aggregator profit as defined by Equation 22 involves maximizing Equation 23 subject to the conditions set forth by Equations 24-43 below:

$$\sum_{t=1}^{T_{trip,i}} (E(PD_i(t))Av_i(t)Comp_i(t)) + SOC_{I,i} \leq MC_i \quad (24)$$

$$\sum_t (E(PD_i(t))Av_i(t)Comp_i(t)) + SOC_{I,i} - \text{Trip}_i \leq MC_i \quad (25)$$

$$(MxAP_i(1) + POP_i(1))Av_i(1)Comp_i Ef_i + SOC_{I,i} \leq MC_i \quad (26)$$

$$MnAP_i(t)Av_i(t) \leq POP_i(t)Av_i(t) \quad (27)$$

$$RsRP_i(t)Av_i(t) \leq POP_i(t)Av_i(t) - MnAP_i(t)Av_i(t) \quad (28)$$

$$(MxAP_i(t) + POP_i(t))Av_i(t)Comp_i Ef_i \leq MP_i \quad (29)$$

$$MxAP_i(t)Av_i(t) \geq 0 \quad (30)$$

$$MnAP_i(t)Av_i(t) \geq 0 \quad (31)$$

$$RsRP_i(t)Av_i(t) \geq 0 \quad (32)$$

$$POP_i(t)Av_i(t) \geq 0 \quad (33)$$

Where:

$$\text{In} = \alpha \sum_t \left( \begin{pmatrix} P_{RU}(t)R_U(t) + \\ P_{RD}(t)R_D(t) + \\ P_{RR}(t)R_R(t) \end{pmatrix} \cdot Av(t)EVPer(t) \right) + \quad (34)$$

$$Mk \sum_i \sum_t (E(PD_i(t))Av(t)EVPer(t))$$

$$R_U(t) = \sum_{i=1}^{devices} MnAP_i(t) \quad (35)$$

$$R_D(t) = \sum_{i=1}^{devices} MxAP_i(t) \quad (36)$$

$$R_R(t) = \sum_{i=1}^{devices} RsRP_i(t) \quad (37)$$

$$\text{Comp}_i(t) = 1 + \frac{\text{Dep}_i(t)}{1 - \text{Dep}_i(t)} \quad (38)$$

$$EVPer(t) = \begin{cases} 1 - \sum_{time=1}^{t} \sum_i \text{Dep}_i(\text{time}) & \text{if } t < T_{trip,i} \\ 1 - \sum_{time=T_{trip}}^{t} \sum_i \text{Dep}_i(\text{time}) & \text{if } t \geq T_{trip,i} \end{cases} \quad (39)$$

And where the expected value of the energy received is given by:

$$E(PD_i(t)) = MxAP_i(t)Ex_D + POP_i(t) - MnAP_i(t)Ex_U - RsRP_i(t)Ex_R \quad (40)$$

$$Ex_D = \frac{\int_{RS_{min}}^{0} RS \cdot Pr(RS) \cdot dRS}{\int_{RS_{min}}^{0} RS \cdot dRS} \quad (41)$$

$$Ex_U = \frac{\int_{0}^{RS_{max}} RS \cdot Pr(RS) \cdot dRS}{\int_{0}^{RS_{max}} RS \cdot dRS} \quad (42)$$

$$Ex_R = \frac{\int_0^{RRS_{max}} RRS \cdot Pr(RRS) \cdot d\,RRS}{\int_0^{RRS_{max}} RRS \cdot d\,RRS} \tag{43}$$

ii. Receive Electrical-System-Regulation Value

At step 604, energy aggregator 102 receives an electrical-system-regulation value from electrical-system operator 104A that indicates a variation from a scheduled power consumption of the electrical system. The electrical-system-regulation value received by energy aggregator 102 in accordance with step 604 may be received in a manner similar to that described with respect to step 304 of method 300.

iii. Determine Second Power Draw for Given Electrical Device

At step 606, energy aggregator 102 determines a second power draw for a given electrical device from the set of electrical devices based on at least the determined respective first power draw for each electrical device and the received electrical-system-regulation value. The second power draw may be determined by energy aggregator 102 in accordance with step 606 in a manner similar to that described with respect to step 306 of method 300.

iv. Receive Responsive-Reserve-Regulation Value

At step 608, energy aggregator 102 receives a responsive-reserve-regulation value from an electrical-system operator that indicates a requested-responsive-reserve amount. Generally, the responsive-reserve-regulation value received by energy aggregator 102 in accordance with step 608 may be received in a manner similar to that described above with respect to step 604 of method 600 and step 304 of method 300.

Electrical-system operator 104A may be arranged to monitor the state of electric resources of electrical utility 104B and compare the state of such electric resources to a pre-determined schedule of electric resources. In the event that the state of such electric resources varies from the predetermined schedule of electric resources to such an extent that responsive reserves are necessary to regulate the electrical resources of electrical system 100, electrical-system operator 102A may indicate as much to energy aggregator 102 by way of communication link 106B.

v. Determine Third Power Draw for Given Electrical Device

At step 610, energy aggregator 102 determines a third power draw for the given electrical device from the set of electrical devices based on at least the determined second power draw and the received responsive-reserve-regulation value. Generally, the third power draw for the given electrical device may be a dispatched power draw for the given electrical device. That is, energy aggregator 102 may direct the given electrical device, perhaps via one of communication links 108B, 110B, or another similar communication link, to operate at the third power draw.

FIG. 7 depicts an additional simplified regulation-algorithm flowchart 700 in accordance with some embodiments. At decision point 702 energy aggregator 102 determines whether the responsive-reserve-regulation-regulation value (RRS) exceeds responsive-reserve-regulation-regulation-value threshold 702A. Note that, in the example shown in FIG. 7, responsive-reserve-regulation-regulation-value threshold 702A is shown as being equal to "0." However, this is for purposes of example and explanation only, and should not be taken to be limiting.

If, at decision point 702, energy aggregator 102 determines that the responsive-reserve-regulation-regulation value (RRS) exceeds responsive-reserve-regulation-regulation-value threshold 702A, then energy aggregator 102 may proceed to decision point 704 where energy aggregator 102 may determine whether first regulation value 704A is less than second regulation value 704B, where first regulation value 406A is a ratio of (i) responsive-reserve-regulation-regulation value (RRS) and (ii) a responsive-reserve capacity of the energy aggregator ($R_R$), multiplied by a reduction in power draw available for spinning reserves of the given electrical device ($RsRP_i$), plus the power draw of the given electrical device, and where second regulation value 704B is a ratio of (i) a charge remaining to be supplied to the given electrical device ($CR_i$) and (ii) a charging efficiency of the given electrical device ($Ef_i$).

If, at decision point 704, energy aggregator 102 determines that first regulation value 704A is less than second regulation value 704B, energy aggregator 102 may proceed to decision point 708 and determine that the third power draw is equal to first regulation value 704A (a ratio of (i) responsive-reserve-regulation-regulation value (RRS) and (ii) a responsive reserve capacity of the energy aggregator ($R_R$), multiplied by a reduction in power draw available for spinning reserves of the given electrical device ($RsRP_i$), plus the power draw of the given electrical device).

If, at decision point 704, energy aggregator 102 determines that first regulation value 704A is greater than second regulation value 704B, energy aggregator 102 may proceed to decision point 706 and determine that the third power draw is equal to second regulation value 704B (a ratio of (i) a charge remaining to be supplied to the given electrical device ($CR_i$) and (ii) a charging efficiency of the given electrical device ($Ef_i$)).

vi. Transmit Third-Power-Draw Message Indicating Third Power Draw

At step 612, energy aggregator 102 transmits to the given electrical device a third-power-draw message indicating the determined third power draw. The third-power-draw message may be sent to the given electrical device in accordance with step 610 in a manner similar to that described with respect to the power-draw message of step 308 of method 300.

As noted above, the third power draw may be a dispatched power draw, and accordingly, a given electrical device that receives the third-power-draw message may respond by adjusting the power draw of its battery to correspond (or to equal) the third power draw indicated in the third-power-draw message. In this way, the power draw of the given electrical device may vary in time, and may additionally be varied for the purposes of providing responsive reserves to electrical system 100, according to the third power draw determined by energy aggregator 102 for the given electrical device.

For purposes of example and explanation, FIG. 8 depicts power-draw chart 810 in accordance with some embodiments. FIG. 8 represents an example power draw 814 ($PD_i$) of a given electrical device. Note that in FIG. 8, the amount of power draw of the given electrical device is shown as the vertical axis 810A and time is shown as the horizontal axis 810B.

Additionally, the first power draw (scheduled power draw or preferred operating point) 812 of the given electrical device is shown as constant in time. Thus, power draw 814 varies in time around, generally, first power draw 812 according to the second power draw indicated in the power-draw message provided by energy aggregator 102.

Further, power-draw chart 810 shows the maximum possible power draw of the given electrical device 816 ($MP_i$). Further still, power-draw chart 810 shows the maximum additional power draw of the given electrical device 818 ($MxAP_i$), as well as the minimum additional power-draw of the given electrical device 826 (MnAP$_i$). And power-draw chart 810 shows the reduction in power draw available for spinning reserves of the given electrical device 828 (RsRP$_i$).

Further still, in accordance with the provisioning of responsive reserves, power-draw chart 810 also shows responsive-reserve amount 822 (which is generally equal to a ratio of (i) responsive-reserve-regulation-regulation value (RRS) and (ii) a responsive-reserve capacity of the energy aggregator (R$_R$), multiplied by a reduction in power draw available for spinning reserves of the given electrical device (RsRP$_i$)). As shown by third power draw 824, power draw 814 (PD$_i$) may be modified according to the responsive-requirements of electrical system 100. That is, in the example shown by power chart 810 electrical system 100 may have experienced an unexpected spike in energy consumed by electrical system 100, and therefore energy aggregator 102 provided a regulation-up service to electrical-system operator 104A by directing the given electrical device to temporary reduce its dispatched power draw (as reflected by third power draw 824).

CONCLUSION

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
    determining, based on at least a respective state of charge of each electrical device from a set of electrical devices, a respective first power draw of each electrical device, wherein each electrical device is coupled to an electrical grid, wherein the respective first power draw is a respective scheduled power draw of each electrical device;
    receiving an electrical-system-regulation value from an electrical-system operator that coordinates electricity transmission in the electrical grid, wherein the received electrical-system-regulation value indicates a variation from a scheduled power consumption of the electrical grid and a particular one of a regulation-down service and a regulation-up service;
    determining a second power draw for a given electrical device from the set of electrical devices based on at least the determined respective first power draw for each electrical device and the received electrical-system-regulation value; and
    transmitting to the given electrical device a power-draw message indicating the determined second power draw.

2. The method of claim 1, wherein the respective second power draw is a respective dispatched power draw of each electrical device.

3. The method of claim 1, wherein determining, based on at least the respective state of charge of each electrical device from the set of electrical devices, the respective first power draw of each electrical device, comprises:
    maximizing an energy-aggregator profit based on at least the respective first power draw for each electrical device.

4. The method of claim 3, wherein maximizing the energy-aggregator profit based on at least the respective first power draw for each electrical device comprises:
    maximizing the energy-aggregator profit based the respective first power draw for each electrical device and at least one of (i) a respective maximum additional power draw for each electrical device, (ii) a respective minimum additional power draw for each electrical device, and (iii) a respective final state of charge for each electrical device.

5. The method of claim 3, wherein the energy-aggregator profit is defined by at least one of an income of the energy aggregator and a cost to the energy aggregator, and wherein maximizing the energy-aggregator profit based on at least the respective first power draw for each electrical device comprises:
    maximizing the energy-aggregator profit subject to a set of conditions, the set of conditions defined by at least (a) the respective first power draw of each electrical device and (b) a respective maximum possible power draw of each electrical device.

6. The method of claim 5, wherein the set of conditions is defined by at least the income of the energy aggregator, and wherein the income of the energy aggregator is determined based on at least a regulation-service income and an energy-supply-service income.

7. The method of claim 5, wherein the set of conditions is defined by at least the cost to the energy aggregator, and the cost to the energy aggregator is determined based on at least a respective minimum-allowable state of charge of each electrical device, a respective final state of charge of each electrical device, and a respective maximum charge capacity of each electrical device.

8. The method of claim 5, wherein the set of conditions is further defined by at least (a) a bid-regulation up capacity of the energy aggregator, (b) a respective minimum additional power draw of each electrical device, (c) a bid-regulation-down capacity of the energy aggregator, (d) a respective maximum additional power draw of each electrical device, (e) a respective expected value of the energy received by each electrical device, (f) a respective final state of charge of each electrical device, (g) a respective initial state of charge of each electrical device, (h) a respective charging efficiency of each electrical device, and (i) a respective maximum charge capacity of each electrical device.

9. The method of claim 8, wherein the set of conditions is further defined by at least a reduction in power draw available for spinning reserves of each electrical device.

10. The method of claim 1, wherein determining, based on at least the respective state of charge of each electrical device from the set of electrical devices, the respective first power draw of each electrical device comprises:
    dividing (i) a difference of a respective maximum charge capacity of each electrical device and a respective current state of charge of each electrical device by (ii) an amount of time remaining in a charging time period.

11. The method of claim 10, wherein the determined first power draw is subject to at least one condition, wherein the at least one condition is one of (a) the first power draw is not greater than a charge remaining to be supplied to the given electrical device, (b) a maximum additional power draw of the given electrical device is the lesser of (i) a difference of a maximum possible power draw of the given electrical device and the first power draw of the given electrical device and (ii) a difference of the charge remaining to be supplied to the given electrical device and the first power draw of the given electrical device, and (c) a minimum additional power draw of the given electrical device is equal to the first power draw of the given electrical device.

12. The method of claim 1, wherein determining the second power draw comprises an energy aggregator determining the second power draw based on at least the respective first power draw for each electrical device and the received electrical-system-regulation value, and wherein the energy aggregator determining the second power draw comprises:

determining that the electrical-system-regulation value exceeds a system-regulation-value threshold;

after determining that the electrical-system-regulation value exceeds the system-regulation-value threshold, determining that a first regulation value is less than a second regulation value, wherein the first regulation value is a ratio of (i) the system-regulation value and (ii) a regulation-up capacity of the energy aggregator, multiplied by a minimum additional power draw of the given electrical device, plus the first power draw of the given electrical device, and wherein the second regulation value is a ratio of (i) a charge remaining to be supplied to the given electrical device and (ii) a charging efficiency of the given electrical device; and responsive to determining that the first regulation value is less than the second regulation value, determining that the second power draw is equal to the first regulation value.

13. The method of claim 1, wherein determining the second power draw comprises an energy aggregator determining the second power draw based on at least the respective first power draw for each electrical device and the received electrical-system-regulation value, and wherein the energy aggregator determining the second power draw comprises:

determining that the electrical-system-regulation value exceeds a system-regulation-value threshold;

after determining that the electrical-system-regulation value exceeds the system-regulation-value threshold, determining that a first regulation value is greater than a second regulation value, wherein the first regulation value is a ratio of (i) the system-regulation value and (ii) a regulation-up capacity of the energy aggregator, multiplied by a minimum additional power draw of the given electrical device, plus the first power draw of the given electrical device, and wherein the second regulation value is a ratio of (i) a charge remaining to be supplied to the given electrical device and (ii) a charging efficiency of the given electrical device; and responsive to determining that the first regulation value is greater than the second regulation value, determining that the second power draw is equal to the second regulation value.

14. The method of claim 1, wherein the second power draw is determined by an energy aggregator, and wherein determining the second power draw based on at least the determined first power draw and the electrical-system-regulation value comprises:

determining that the electrical-system-regulation value does not exceed a system-regulation-value threshold;

after determining that the electrical-system-regulation value does not exceed the system-regulation-value threshold, determining that a first regulation value is less than a second regulation value, wherein the first regulation value is a ratio of (i) the system-regulation value and (ii) a regulation-down capacity of the energy aggregator, multiplied by a maximum additional power draw of the given electrical device, plus the first power draw of the given electrical device, and wherein the second regulation value is a ratio of (i) a charge remaining to be supplied to the given electrical device and (ii) a charging efficiency of the given electrical device; and responsive to determining that the first regulation value is less than the second regulation value, determining that the second power draw is equal to the first regulation value.

15. The method of claim 1, wherein the second power draw is determined by an energy aggregator, and wherein determining the second power draw based on at least the determined first power draw and the electrical-system-regulation value comprises:

determining that the electrical-system-regulation value does not exceed a system-regulation-value threshold;

after determining that the electrical-system-regulation value does not exceed the system-regulation-value threshold, determining that a first regulation value is greater than a second regulation value, wherein the first regulation value is a ratio of (i) the system-regulation value and (ii) a regulation-down capacity of the energy aggregator, multiplied by a maximum additional power draw of the given electrical device, plus the first power draw of the given electrical device, and wherein the second regulation value is a ratio of (i) a charge remaining to be supplied to the given electrical device and (ii) a charging efficiency of the given electrical device; and responsive to determining that the first regulation value is greater than the second regulation value, determining that the second power draw is equal to the second regulation value.

16. The method of claim 1, wherein the second power draw is determined by an energy aggregator, the method further comprising:

receiving a responsive-reserve-regulation value from an electrical-system operator that indicates a requested-responsive-reserve amount;

determining that the responsive-reserve-regulation value exceeds a responsive-reserve-regulation-value threshold;

after (i) determining that the responsive-reserve-regulation value exceeds the responsive-reserve-regulation-value threshold and (ii) determining the second power draw for a given electrical device, determining that a first regulation value is less than a second regulation value, wherein the first regulation value is a ratio of (i) the responsive-reserve-regulation value and (ii) a responsive-reserve capacity of the energy aggregator, multiplied by a reduction in power draw available for spinning reserves for the given electrical device, plus the second power draw of the given electrical device, and wherein the second regulation value is a ratio of (i) a charge remaining to be supplied to the given electrical device and (ii) a charging efficiency of the given electrical device;

responsive to determining that the first regulation value is less than the second regulation value, determining that a third power draw is equal to the first regulation value; and transmitting to the given electrical device a third power-draw message indicating the determined third power draw.

17. The method of claim 1, wherein the second power draw is determined by an energy aggregator, the method further comprising:

receiving a responsive-reserve-regulation value from an electrical-system operator that indicates a requested-responsive-reserve amount;

determining that the responsive-reserve-regulation value exceeds a responsive-reserve-regulation-value threshold;

after (i) determining that the responsive-reserve-regulation value exceeds the responsive-reserve-regulation-value threshold and (ii) determining the second power draw for a given electrical device, determining that a first regulation value is greater than a second regulation value, wherein the first regulation value is a ratio of (i) the responsive-reserve-regulation value and (ii) a responsive-reserve capacity of the energy aggregator, multiplied by a reduction in power draw available for spinning reserves for the given electrical device, plus the second power draw of the given electrical device, and wherein the second regulation value is a ratio of (i) a charge remaining to be supplied to the given electrical device and (ii) a charging efficiency of the given electrical device;

responsive to determining that the first regulation value is greater than the second regulation value, determining that a third power draw is equal to the second regulation value; and transmitting to the given electrical device a third power-draw message indicating the determined third power draw.

18. A computing device comprising:

a non-transitory computer readable medium; and program instructions stored on the non-transitory computer readable medium and executable by at least one processor to cause the computing device to:

determine, based on at least a respective state of charge of each electrical device from a set of electrical devices, a respective first power draw of each electrical device, wherein each electrical device is coupled to an electrical grid, wherein the respective first power draw is a respective scheduled power draw of each electrical device;

receive an electrical-system-regulation value from an electrical-system operator that coordinates electricity transmission throughout the electrical grid, wherein the received electrical-system-regulation value indicates a variation from a scheduled power consumption of the electrical grid and a particular one of a regulation-down service and a regulation-up service;

determine a second power draw for a given electrical device from the set of electrical devices based on at least the determined respective first power draw for each electrical device and the received electrical-system-regulation value; and transmit to the given electrical device a power-draw message indicating the determined second power draw.

19. The computing device of claim 18, wherein determining, based on at least the respective state of charge of each electrical device from the set of electrical devices, the respective first power draw of each electrical device, comprises:

maximizing an energy-aggregator profit based on at least the respective first power draw for each electrical device.

20. The computing device of claim 19, wherein maximizing the energy-aggregator profit based on at least the respective first power draw for each electrical device comprises:

maximizing the energy-aggregator profit subject to a set of conditions, the set of conditions, the set of conditions defined by at least (a) one of an income of the energy aggregator and a cost to the energy aggregator, (b) a respective first power draw of each electrical device, and (c) a respective maximum possible power draw of each electrical device.

21. The computing device of claim 19, wherein maximizing the energy-aggregator profit based on at least the respective first power draw for each electrical device comprises:

maximizing the energy-aggregator profit subject to a set of conditions, the set of conditions defined by at least (a) one of an income of the energy aggregator and a cost to the energy aggregator, (b) a respective first power draw of each electrical device, and (c) a respective maximum possible power draw of each electrical device.

22. The computing device of claim 21, wherein the set of conditions is further defined by at least (a) a bid-regulation up capacity of the energy aggregator, (b) a respective minimum additional power draw of each electrical device, (c) a bid-regulation-down capacity of the energy aggregator, (d) a respective maximum additional power draw of each electrical device, (e) a respective expected value of the energy received by each electrical device, (f) a respective final state of charge of each electrical device, (g) a respective initial state of charge of each electrical device, (h) a respective charging efficiency of each electrical device, and (i) a respective maximum charge capacity of each electrical device.

23. The computing device of claim 18, wherein determining, based on at least the respective state of charge of each electrical device from the set of electrical devices, the respective first power draw of each electrical device comprises:

dividing (i) a difference of a respective maximum charge capacity of each electrical device and a respective current state of charge of each electrical device by (ii) an amount of time remaining in a charging time period.

24. The computing device of claim 18, wherein determining the second power draw comprises an energy aggregator determining the second power draw based on at least the respective first power draw for each electrical device and the received electrical-system-regulation value, and wherein the energy aggregator determining the second power draw comprises:

determining that the electrical-system-regulation value exceeds a system-regulation-value threshold;

after determining that the electrical-system-regulation value exceeds the system-regulation-value threshold, determining that a first regulation value is less than a second regulation value, wherein the first regulation value is a ratio of (i) the system-regulation value and (ii) a regulation-up capacity of the energy aggregator, multiplied by a minimum additional power draw of the given electrical device, plus the first power draw of the given electrical device, and wherein the second regulation value is a ratio of (i) a charge remaining to be supplied to the given electrical device and (ii) a charging efficiency of the given electrical device; and responsive to determining that the first regulation value is less than the second regulation value, determining that the second power draw is equal to the first regulation value.

25. The computing device of claim 18, wherein determining the second power draw comprises an energy aggregator determining the second power draw based on at least the respective first power draw for each electrical device and the received electrical-system-regulation value, and wherein the energy aggregator determining the second power draw comprises:

determining that the electrical-system-regulation value exceeds a system-regulation-value threshold;

after determining that the electrical-system-regulation value exceeds the system-regulation-value threshold, determining that a first regulation value is greater than a second regulation value, wherein the first regulation value is a ratio of (i) the system-regulation value and (ii) a regulation-up capacity of the energy aggregator, multiplied by a minimum additional power draw of the given electrical device, plus the first power draw of the given electrical device, and wherein the second regulation value is a ratio of (i) a charge remaining to be supplied to the given electrical device and (ii) a charging efficiency of the given electrical device; and responsive to determining that the first regulation value is greater than the second regulation value, determining that the second power draw is equal to the second regulation value.

26. The computing device of claim 18, wherein the second power draw is determined by an energy aggregator, and wherein determining the second power draw based on at least the determined first power draw and the electrical-system-regulation value comprises:

determining that the electrical-system-regulation value does not exceed a system-regulation-value threshold;

after determining that the electrical-system-regulation value does not exceed the system-regulation-value threshold, determining that a first regulation value is less than a second regulation value, wherein the first regulation value is a ratio of (i) the system-regulation value and (ii) a regulation-down capacity of the energy aggregator, multiplied by a maximum additional power draw of the given electrical device, plus the first power draw of the given electrical device, and wherein the second regulation value is a ratio of (i) a charge remaining to be supplied to the given electrical device and (ii) a charging efficiency of the given electrical device; and responsive to determining that the first regulation value is less than the second regulation value, determining that the second power draw is equal to the first regulation value.

27. The computing device of claim 18, wherein the second power draw is determined by an energy aggregator, and wherein determining the second power draw based on at least the determined first power draw and the electrical-system-regulation value comprises:

determining that the electrical-system-regulation value does not exceed a system-regulation-value threshold;

after determining that the electrical-system-regulation value does not exceed the system-regulation-value threshold, determining that a first regulation value is greater than a second regulation value, wherein the first regulation value is a ratio of (i) the system-regulation value and (ii) a regulation-down capacity of the energy aggregator, multiplied by a maximum additional power draw of the given electrical device, plus the first power draw of the given electrical device, and wherein the second regulation value is a ratio of (i) a charge remaining to be supplied to the given electrical device and (ii) a charging efficiency of the given electrical device; and responsive to determining that the first regulation value is greater than the second regulation value, determining that the second power draw is equal to the second regulation value.

28. The computing device of claim 18, wherein the second power draw is determined by an energy aggregator, the system further comprising program instructions stored on the non-transitory computer readable medium and executable by at least one processor to cause the computing device to:

receive a responsive-reserve-regulation value from an electrical-system operator that indicates a requested-responsive-reserve amount;

determine that the responsive-reserve-regulation value exceeds a responsive-reserve-regulation-value threshold;

after (i) determining that the responsive-reserve-regulation value exceeds the responsive-reserve-regulation-value threshold and (ii) determining the second power draw for a given electrical device, determine that a first regulation value is less than a second regulation value, wherein the first regulation value is a ratio of (i) the responsive-reserve-regulation value and (ii) a responsive-reserve capacity of the energy aggregator, multiplied by a reduction in power draw available for spinning reserves for the given electrical device, plus the second power draw of the given electrical device, and wherein the second regulation value is a ratio of (i) a charge remaining to be supplied to the given electrical device and (ii) a charging efficiency of the given electrical device;

responsive to determining that the first regulation value is less than the second regulation value, determine that a third power draw is equal to the first regulation value; and transmit to the given electrical device a third power-draw message indicating the determined third power draw.

29. The computing device of claim 18, wherein the second power draw is determined by an energy aggregator, the system, further comprising program instructions stored on the non-transitory computer readable medium and executable by at least one processor to cause the computing device to:

receive a responsive-reserve-regulation value from an electrical-system operator that indicates a requested-responsive-reserve amount;

determine that the responsive-reserve-regulation value exceeds a responsive-reserve-regulation-value threshold;

after (i) determining that the responsive-reserve-regulation value exceeds the responsive-reserve-regulation-value threshold and (ii) determining the second power draw for a given electrical device, determine that a first regulation value is greater than a second regulation value, wherein the first regulation value is a ratio of (i) the responsive-reserve-regulation value and (ii) a responsive-reserve capacity of the energy aggregator, multiplied by a reduction in power draw available for spinning reserves for the given electrical device, plus the second power draw of the given electrical device, and wherein the second regulation value is a ratio of (i) a charge remaining to be supplied to the given electrical device and (ii) a charging efficiency of the given electrical device;

responsive to determining that the first regulation value is greater than the second regulation value, determine that a third power draw is equal to the second regulation value; and transmit to the given electrical device a third power-draw message indicating the determined third power draw.

30. A non-transitory computer-readable medium having computer executable instructions stored thereon, the instructions comprising:

instructions for determining, based on at least a respective state of charge of each electrical device from a set of electrical devices, a respective first power draw of each electrical device, wherein each electrical device is coupled to an electrical grid, wherein the respective first power draw is a respective scheduled power draw of each electrical device;

instructions for receiving an electrical-system-regulation value from an electrical-system operator that coordinates electricity transmission in the electrical grid, wherein the received electrical-system-regulation value indicates a variation from a scheduled power consumption of the electrical grid and a particular one of a regulation-down service and a regulation-up service;
instructions for determining a second power draw for a given electrical device from the set of electrical devices based on at least the determined respective first power draw for each electrical device and the received electrical-system-regulation value; and
instructions for transmitting to the given electrical device a power-draw message indicating the determined second power draw.

* * * * *